United States Patent [19]

Nakai et al.

[11] Patent Number: 5,073,960
[45] Date of Patent: Dec. 17, 1991

[54] IMAGE PROCESSING METHOD USING IMPROVED BRESENHAM ALGORITHM IN CREATING AN OUTLINE OF A FIGURE TO BE PAINTED AND APPARATUS ADOPTING THE METHOD

[75] Inventors: Yoshiyuki Nakai, Nara; Kazuo Maruta; Tatsushi Nakajima, both of Yamatokooriyama; Seido Kawanaka, Yawata, all of Japan

[73] Assignee: Sharp Kabushiki Kaisha, Osaka, Japan

[21] Appl. No.: 524,428

[22] Filed: May 17, 1990

[30] Foreign Application Priority Data

| May 18, 1989 | [JP] | Japan | 1-125295 |
| May 18, 1989 | [JP] | Japan | 1-125296 |
| May 26, 1989 | [JP] | Japan | 1-134369 |
| Jun. 20, 1989 | [JP] | Japan | 1-158031 |
| Aug. 11, 1989 | [JP] | Japan | 1-208630 |

[51] Int. Cl.[5] .............................. G06F 3/153
[52] U.S. Cl. .................... 382/22; 340/747; 395/141
[58] Field of Search ............ 340/728, 744, 747; 364/518, 521; 382/22

[56] References Cited

U.S. PATENT DOCUMENTS

| 4,736,330 | 3/1988 | Capowski | 364/518 |
| 4,745,575 | 5/1988 | Hawes | 340/747 |
| 4,758,965 | 7/1988 | Tiang et al. | 364/518 |
| 4,763,119 | 8/1988 | Matsubara et al. | 340/747 |
| 4,815,009 | 3/1989 | Blatin | 364/518 |
| 4,853,971 | 8/1989 | Nonura | 382/22 |
| 4,974,172 | 11/1990 | Nakai | 340/747 |

FOREIGN PATENT DOCUMENTS 53-41017 8/1978 Japan .

Primary Examiner—Stephen Brinich

[57] ABSTRACT

By an image processing method, a contour of a figure is represented with a series of clockwise outline vectors, a sense of each vector being set such that the figure be painted out by painting a left side of the vector, then, an outline is created from the outline vectors, and the figure is painted through a scanning operation in an x-axis direction by starting a painting operation at an odd-numbered intersection of the outline and a horizontal scanning line and suspending the painting operation at an even-numbered intersection thereof, thus painting pixels between the odd-numbered intersection and the even-numbered intersection, inclusive of the pixel at the odd-numbered intersection but exclusive of the pixel at the even-numbered intersection. In order to create the outline, plotting points for the outline are first calculating from the outline vectors through use of Bresenham algorithm. Then, a positional relation of a current plotting point to the previous one and the next one is obtained. A positional variation in the y-axis direction between the current plotting point and the previous one calculated based on the positional relation is stored in a flag. In creating the outline, outline components are plotted one after another based on the positional relation of the current plotting point to the previous one and to the next one, or based on the positional variation in the y-axis direction.

7 Claims, 25 Drawing Sheets

Fig. 7A
PRIOR ART
Fig. 7B
PRIOR ART
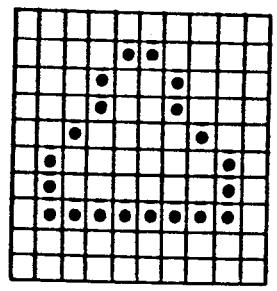
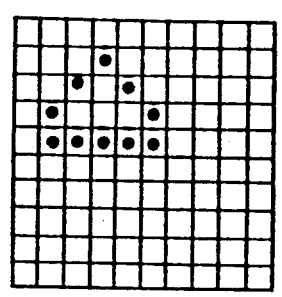
Fig. 8A
PRIOR ART
Fig. 8B
PRIOR ART
Fig. 8C
PRIOR ART
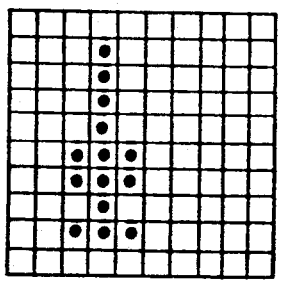
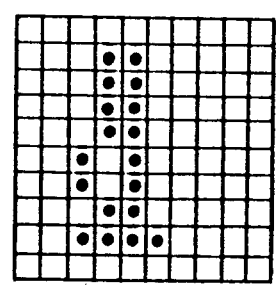
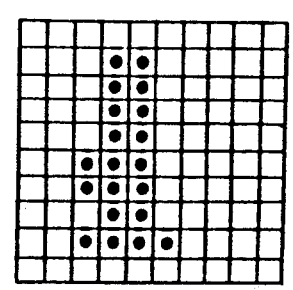
Fig. 9A
```
①①①
1   1
1   1
1 figure 1
①①①①①①①
```
Fig. 9B
```
    ①
    ①
  1 figure 1
  1       1
  1 1 1 1
```
Fig. 9C
```
1 1 1 1 1 1 1
1  figure  1
1  1 1 1 1
1  1 hole ①
1 1 1 1 1 1 1
```
Fig. 9D
```
①①①
①     ①
① hole ①
①     ①
①①①
```

Fig. 12
| Fig. 12A |
|---|
| Fig. 12B |
| Fig. 12C |
Fig. 12A
(i) Start poit
```
0 0 0 1 1 1 0 0 0 0 0 0
0 1 1 0 0 0 1 1 1 0 0 0
1 1 1 1 1 1 1 1 1 1 1 0
```
(ii)
```
0 0 0 b a 0 0 0 0 0 0 0
0 0 0 0 0 0 0 0 0 0 0 0
0 0 0 0 0 0 0 0 0 0 0 0
```
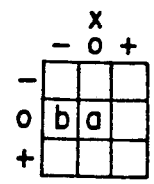
ADX −  ⟶ SADX−
ADY o  ⟶ SADY o
(iii)
```
0 0 0 b 0 0 0 0 0 0 0 0
0 0 c 0 0 0 0 0 0 0 0 0
0 0 0 0 0 0 0 0 0 0 0 0
```
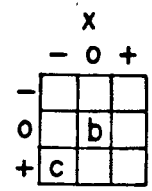
FDX −
FDY o ⟵ ⟶ FFDY+
ADX −
ADY +
(iv)
```
0 0 0 1 0 0 0 0 0 0 0 0
0 d c 0 0 0 0 0 0 0 0 0
0 0 0 0 0 0 0 0 0 0 0 0
```
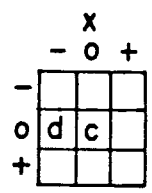
FDX −
FDY + ⟵   FFDY+
ADX −
ADY o
(v)
```
0 0 0 1 0 0 0 0 0 0 0 0
0 d 0 0 0 0 0 0 0 0 0 0
e 0 0 0 0 0 0 0 0 0 0 0
```
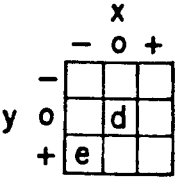
FDX −
FDY o ⟵ ⟶ FFDY+
ADX −
ADY +
(vi)
```
0 0 0 1 0 0 0 0 0 0 0 0
0 1 0 0 0 0 0 0 0 0 0 0
e f 0 0 0 0 0 0 0 0 0 0
```
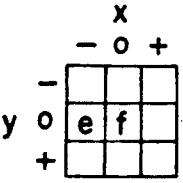
FDX −
FDY + ⟵  FFDY+
ADX +
ADY o

Fig. 12B (vii)
```
000100000000
010000000000
1fg00000000
```
y: −0+ / f g (middle row)

F D X +
F D Y o
A D X +
A D Y o

FFDY+

(viii)
```
000100000000
010000000000
10gh00000000
```
y: g h (middle row)

F D X +
F D Y o
A D X +
A D Y o

FFDY+

(ix)
```
000100000000
010000000000
100000001j0
```
y: i j (middle row)

F D X +
F D Y o
A D X +
A D Y o

FFDY+

(x)
```
000100000000
010000000000
10000000kj0
```
y: k j (middle row)

F D X +
F D Y o
A D X −
A D Y o

FFDY+

(xi)
```
000100000000
010000001000
10000000k01
```
y: l (top) k (middle)

F D X −
F D Y o
A D X −
A D Y −

FFDY−

(xii)
```
000100000000
010000m1000
100000000001
```
y: m l (middle row)

F D X −
F D Y −
A D X −
A D Y o

FFDY−

(Xiii)  0 0 0 1 0 0 0 0 0 0 0 0
       0 1 0 0 0 0 n m 0 1 0 0
       1 0 0 0 0 0 0 0 0 0 0 1

(XiV)  0 0 0 1 0 0 0 0 0 0 0 0
       0 1 0 0 0 0 n 0 0 1 0 0
       1 0 0 0 0 0 0 0 0 0 0 1

(XV)  0 0 0 1 p 0 0 0 0 0 0 0
       0 1 0 0 0 0 0 0 0 1 0 0
       1 0 0 0 0 0 0 0 0 0 0 1

(XVi)  0 0 0 1 p 0 1 0 0 0 0 0
       0 1 0 0 0 0 0 0 0 1 0 0
       1 0 0 0 0 0 0 0 0 0 0 1

(XVii)  0 0 0 1 0 0 1 0 0 0 0 0
       0 1 0 0 0 0 0 0 0 1 0 0
       1 0 0 0 0 0 0 0 0 0 0 1

(XViii)  0 0 0 1 1 1 0 0 0 0 0 0
       0 1 1 1 1 1 1 1 1 0 0 0
       1 1 1 1 1 1 1 1 1 1 1 0

Fig. 13

| Processing \ Flag | FDX | FDY | ADX | ADY | FFDY / Positional relation in y direction |
|---|---|---|---|---|---|
| (1) Plot a current point as it is | + | + | + | 0 | No relation |
| | + | + | + | + | |
| | + | + | 0 | + | |
| | + | + | − | + | |
| | 0 | + | + | 0 | |
| | 0 | + | + | + | |
| | 0 | + | 0 | + | |
| | 0 | + | − | + | |
| | − | + | + | 0 | |
| | − | + | + | + | |
| | − | + | 0 | + | |
| | − | + | − | + | |
| | − | 0 | + | + | |
| | − | 0 | 0 | + | |
| | − | 0 | − | + | |
| | + | 0 | − | 0 | − |
| | − | 0 | + | 0 | − |
| (2) Shift a current point by one dot in the x direction and plot there | − | − | − | 0 | No relation |
| | − | − | − | − | |
| | − | − | 0 | − | |
| | − | − | + | − | |
| | 0 | − | − | 0 | |
| | 0 | − | − | − | |
| | 0 | − | 0 | − | |
| | 0 | − | + | − | |
| | + | − | − | 0 | |
| | + | − | − | − | |
| | + | − | 0 | − | |
| | + | − | + | − | |
| | + | 0 | − | − | |
| | + | 0 | 0 | − | |
| | + | 0 | + | − | |
| | + | 0 | − | 0 | + |
| | − | 0 | + | 0 | + |
| (3) Plot both a current point and a point shifted one dot from the current point | + | + | 0 | − | No relation |
| | + | + | + | − | |
| | 0 | + | + | − | |
| | − | − | 0 | + | |
| | − | − | − | + | |
| | 0 | − | − | + | |
| | + | + | − | − | |
| | 0 | + | 0 | − | |
| | − | + | + | − | |
| | + | − | − | + | |
| | 0 | − | 0 | + | |
| | − | − | + | + | |
| (4) Do not plot | All the other patterns | | | | |

Fig.14A
| | |
|---|---|
| FDX | 1 |
| FDY | 0 |
| ADX | 1 |
| ADY | 1 |
Fig.14B
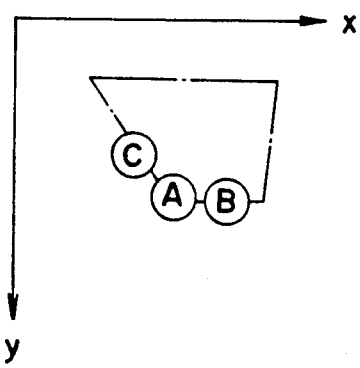
Fig.14C
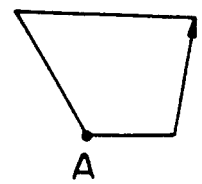
Fig.15A
| | |
|---|---|
| FDX | -1 |
| FDY | 1 |
| ADX | -1 |
| ADY | -1 |
Fig.15B
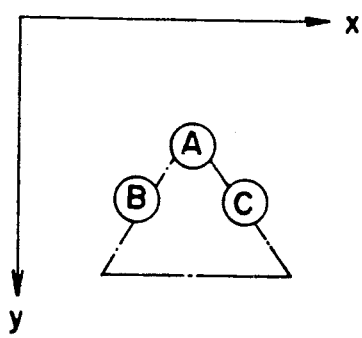
Fig.15C
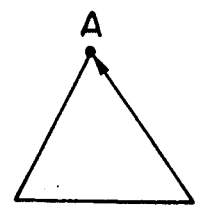

Fig. 23A
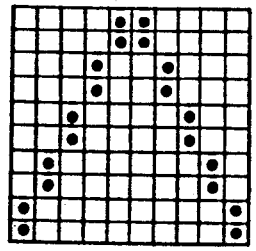
Fig. 23B
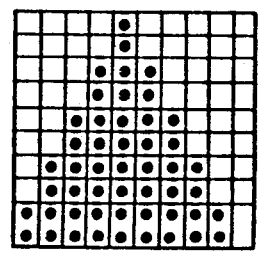
Fig. 24A
10010000
10001000
10000100
10000010
10000001
Fig. 24B
001100
001100
010010
100001
100010
Fig. 24C
10000001
10000001
10010011
10010011
10010000
Fig. 24D
010010
110011
110011
110011
010010
Fig. 25A
11100000
11110000
11111000
11111100
11111110
Fig. 25B
001000
001000
011100
111110
111100
Fig. 25C
11111110
11111110
11100010
11100010
11100000
Fig. 25D
011100
100010
100010
100010
011100

Fig. 28
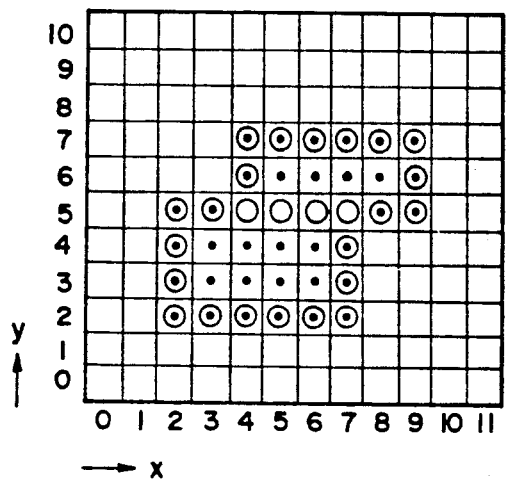
Fig. 29A
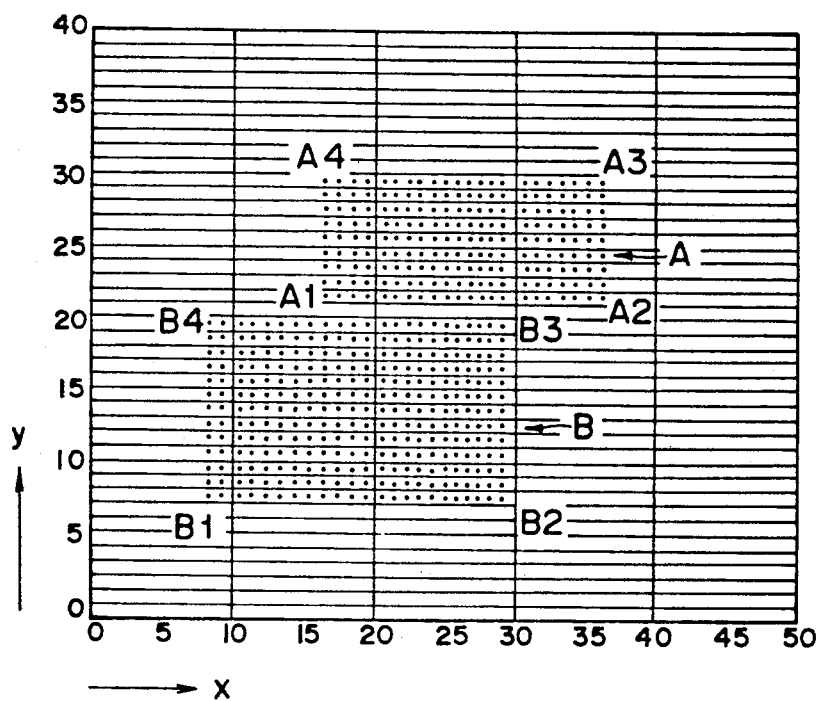
Fig. 29B
| | Figure A | Figure B |
|---|---|---|
| Start point | (16, 22) | (8, 8) |
| | Vector(20, 0) | Vector(20, 0) |
| | Vector(0, 8) | Vector(0, 12) |
| | Vector(-20, 0) | Vector(-20, 0) |
| | Vector(0, -8) | Vector(0, -12) |

Fig. 30A
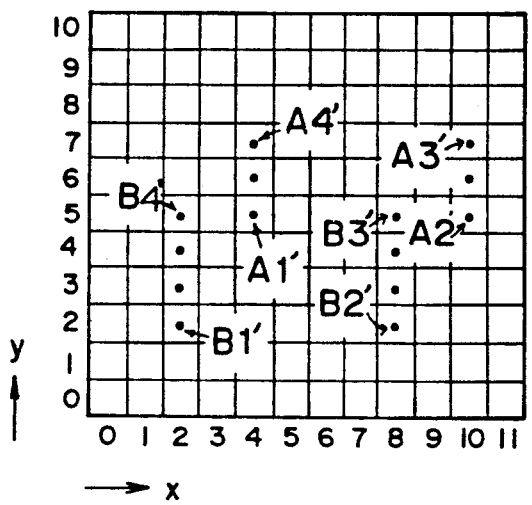
Fig. 30B
| Figure A | Figure B |
|---|---|
| Start point (4,5) | Start point (2,2) |
| Vector (5,0) | Vector (5,0) |
| Vector (0,2) | Vector (0,3) |
| Vector (-5,0) | Vector (-5,0) |
| Vector (0,-2) | Vector (0,-3) |
Fig. 31
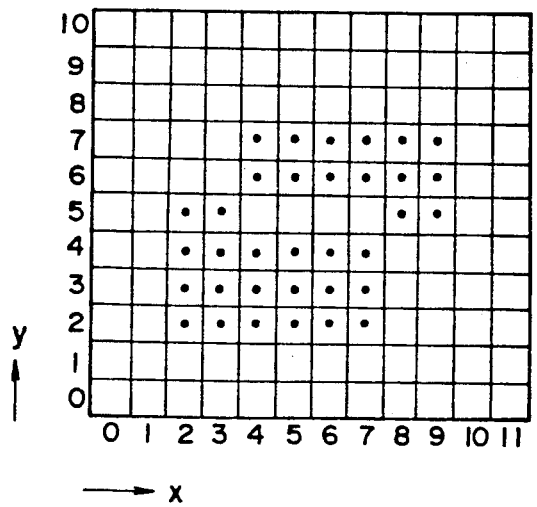

Fig. 32A  Fig. 32B
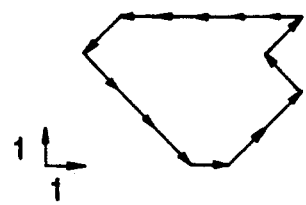
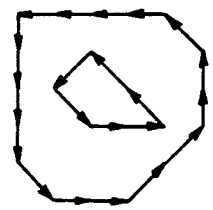
Fig. 33
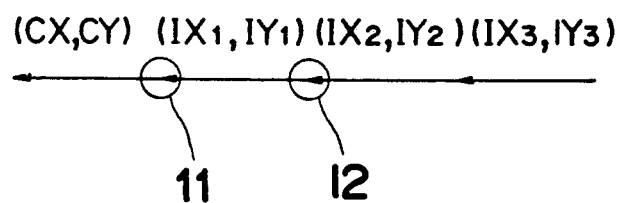
Fig. 34
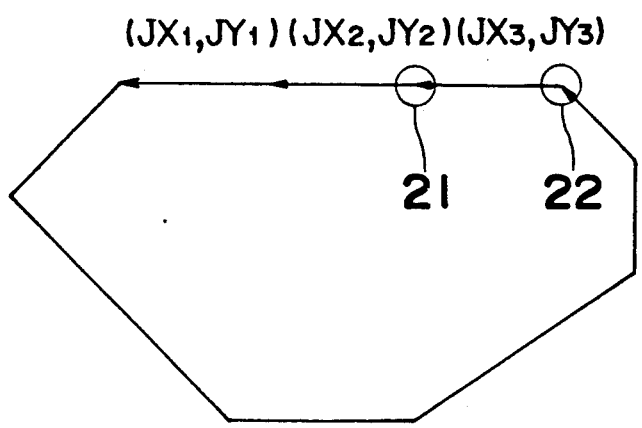

IMAGE PROCESSING METHOD USING IMPROVED BRESENHAM ALGORITHM IN CREATING AN OUTLINE OF A FIGURE TO BE PAINTED AND APPARATUS ADOPTING THE METHOD

BACKGROUND OF THE PRESENT INVENTION

The present invention generally relates to an image processing method and apparatus and particularly to a method and apparatus for creating an outline of a figure to be painted out from outline vectors which represent the contour of the figure, and then painting the figure by painting an internal region surrounded by the outline through a scanning operation.

Conventionally, a seed filling method or a scan filling method is known as a method of painting out an arbitrary region of a figure. Although the seed filling method is adopted in many image processors, it has a defect that the processing speed is slower as compared with the scan filling method.

In the scan filling method, the contour of a figure to be painted out is represented by outline vectors, as shown in FIG. 1, which are so oriented that the figure is painted out by painting out the left side of the outline vectors. For example, from the initial data shown in FIG. 2A, the outline vectors shown in FIG. 2B are created. Such an outline as shown in FIG. 3A is created from these outline vectors, and in the scanning operation in the x direction, i.e., horizontal direction, the painting-out operation is started at an odd-numbered intersection between each horizontal scanning line and the outline, with the painting-out operation being stopped at an even-numbered intersection, thus resulting in such a figure as shown in FIG. 3B.

An image processing apparatus adopting a scan filling method as described above to paint a figure is disclosed in Japanese Patent Publication (Tokkosho) No. 53-41017. The image processing apparatus creates an outline from outline vectors by means of an algorithm of the known Bresenham method, and as a result, outlines as shown in FIG. 4A, FIG. 5A, and FIG. 6A, for example, are provided. Each outline is composed of outline components.

In the scanning operation along each of the horizontal scanning lines in the x direction, the printing-out operation is started at an odd-numbered intersection between each horizontal scanning line and the outline, with a pixel on the odd-numbered intersection included in the painting-out region. The painting-out operation is stopped at an even-numbered intersection, with a pixel on the even-numbered intersection being included in the painting-out region.

In the case of creating an outline by the conventional image processing apparatus described above, when outline vectors overlap each other on the same pixel as at the top portion in FIG. 4A or at the central portion in FIG. 5A, the pixel becomes a component of the outline, or a point on the outline. Accordingly, when the horizontal scanning line intersects that outline component, all pixels on the right side thereof, inclusive of the outline component, are painted out, so that the painting out errors as shown in FIG. 4B and FIG. 5B are caused. On the other hand, when an outline is created along a horizontal scanning line as shown in FIG. 6A, if the last component of the outline falls on an odd-numbered pixel counted from the initial pixel that the scanning line intersects, the pixel on the right side of the odd-numbered pixel is painted out, thus causing such painting-out errors as shown in FIG. 6B.

In order to prevent such error from being caused, according to the conventional processing operation, the position of a pixel deviated by one dot in the x-axial direction from the outline component on the top portion is also plotted as an outline component, as shown in, for example, FIG. 3A. Also, for the outline parallel to the scanning direction, the processing operation is effected so that the outline may be even-numbered dots in length or only a starting point and an end point are plotted. In this case, however, the processing speed of a host computer effecting the processing operation becomes slower, with the load on the host computer becoming larger. Furthermore, when the outline obtained through the processing operation effected on the vector font is stored in a mask ROM, etc., and scaled down or rotated, such painting out errors may be caused again. For example, when the outline shown in FIG. 7A is contracted as shown in FIG. 7B, painting-out errors as above-described will happen. When the processing is effected on the outline shown in FIG. 8A, the outline becomes such as shown in FIG. 8B. When it is painted out, a figure as shown in FIG. 8C, which is different in shape from the figure shown in FIG. 8A, is obtained.

Outlines which will cause errors and/or change shapes of original figures in such a painting-out operation are shown, as typical examples, in FIGS. 9A, 9B, 9C, and 9D. The outlines shown in FIG. 9A and 9B are similar to those shown in FIG. 4A and FIG. 6A. FIG. 9C shows a case wherein a pixel is shared by two boundaries, and FIG. 9D shows a case wherein two boundaries are in complete conformity with each other as the most extreme case of FIG. 9C. The outline components surrounded by a circle mark are those which cause the error.

In the above-described conventional image processing apparatus, because such outlines as shown in FIGS. 9A through 9D are produced during the outline creation, it is necessary to process the outline in order to prevent the errors from being caused during the figure painting-out operation, resulting in a problem that the processing speed becomes slower. Furthermore, because of the above-described outline processing, the shape of a figure after the painting-out becomes considerably different from its original shape, resulting in a problem that the characteristics of the vector font with easy magnification and rotation and beautiful font can not be fully utilized.

FIG. 18 is a drawing showing another example of the outline vectors, and FIG. 19 is a drawing showing an outline created by the conventional method using the Bresenham algorithm on the vector C in FIG. 18, and FIGS. 22A and 22B are flow charts showing the conventional method using the Bresenham algorithm.

Hereinbelow, with reference to the flow charts in FIGS. 22A and 22B, the procedure of creating the outline of FIG. 19 from the vector, C of FIG. 18 will be described.

First, at step S71, the absolute value of the abscissa (x) difference between the starting point (xc1, yc1) of vector C and the end point (xc2, yc2) thereof is calculated as "deltax" and the absolute value of the ordinate (y) difference is calculated as "deltay". At step S72, when "deltax" is larger than "deltay", the x-axis is selected as a major axis and flow proceeds to step S73. But when "deltax" is smaller, the y-axis is selected as a major axis and a corresponding procedure is carried out. At step S73, an initial value of "e" and constants (cons1 cons2) are set. This "e" assumes a value cons2−deltax (e=-cons2−deltax) when the flow proceeds to step S83. The expression e=cons2−deltax is obtained by multiplying 2*deltax on both sides of the expression e=deltay/deltax−0.5 to make each side an integer and then by newly replacing 2*deltax*e with e. Accordingly, e>0 means that the y-ordinate of the vector at an intersection of the vector and a line running parallel to the y-axis across a prospective pixel indication point is closer to the ordinate of another pixel indication point which is obtained by increasing or decreasing the ordinate of the prospective pixel indication point by one, than to the ordinate of the prospective indication point. Next, the flow proceeds from step S74 to step S78 or step S79, and whether an increment (inc=1) or a decrement (inc=−1) is to be made is determined in accordance with the sense and inclination of the vector. At step S80, the starting point of the vector is made the first display point of the pixel. Next, at step S81, the discrimination is made as to whether e>0 or not, and when e is not larger than 0, after calculating e=e+cons2 at step S83, a pixel on a predetermined display point is displayed at step S84, while in the case of a positive e, increment or decrement of the y ordinate is carried out at step S82 and at the same time e is calculated to be e=e+cons1 and thereafter, at step S84, a pixel is displayed on a next display point where the y ordinate is increased (or decreased) by one from the predetermined display point. Then, after increasing or decreasing the abscissa (x) by one at step S85, the flow is returned from step S86 to step S81, and thereafter, the same procedure is repeated up to the end point of the vector.

By the above-described processing the outline shown in FIG. 19 is created from the vector C shown in FIG. 18.

However, even when painting is made based on this outline by the odd-even method shown in FIG. 17, the scanning is stopped at the pixels indicated by white circles, and the inside of the outline can not be painted out. In order to solve this problem, a conventional method uses a 3-by-3 mesh filter in the following manner. The outline is scanned in the x direction by the filter, and during the scanning, the central portion of the filter is arranged so as to fall on each pixel shown in FIG.19. When a matrix pattern obtained through the scanning by the filter becomes the same as any of the patterns as shown in FIG. 20, the pixel in the center of the matrix pattern obtained is painted, and when it becomes different from those patterns shown in FIG. 20, the central pixel thereof is not painted. In this way, unnecessary pixels are removed.

For example, when the filter is applied to the leftmost pixel in FIG. 19, a matrix pattern obtained becomes the same as the pattern at the left end of the lower row in FIG. 20, and thus the pixel is painted. Since none of the patterns shown in FIG. 20 is obtained with respect to the pixel on the right side of the leftmost pixel, it is not painted. In this way, pixels marked with a circle having an x mark contained therein are painted, with pixels indicated only by circle marks being excluded from painting. The patterns shown in FIG. 20 are used for a vector tending to the direction in which y ordinates decrease, like the vector C, and the patterns as shown in FIG. 21 are used for a vector tending to the direction in which y ordinates increase. In the case where the y-axis is used as the major axis, it is not necessary to use the filter because the outline as shown in FIG. 20 is not obtained in such a case.

As described above, according to the conventional image processing method, in the case where the x-axis is the major axis, the processing with the 3-by-3 mesh filter is required after the processing using the Bresenham algorithm, thus resulting in a problem of taking time in processing.

SUMMARY OF THE PRESENT INVENTION

Accordingly, an essential object of the present invention is to provide an image processing apparatus and method by which creation of outlines of figures and painting-out of the figures are effected so that painting-out errors and deformations of figures can be prevented with the image processing speed being kept at a high level.

In order to accomplish the above object, according to a first aspect of the present invention, in an image processing apparatus which represents a contour of a figure with a series of outline vectors, setting a sense of each vector such that the figure be painted out by painting a left side of the vector, and then, creates an outline from the outline vectors, and paints out the figure through a scanning operation in an x-axis direction by starting a painting operation at an odd-numbered intersection of the outline and a horizontal scanning line and suspending the painting operation at an even-numbered intersection of the outline and the horizontal scanning line during the scanning operation, the image processing apparatus comprises a plotting point calculation unit for calculating plotting points for the outline from the outline vectors through use of Bresenham algorithm; a positional relation calculation unit for calculating a positional relation between a current plotting point and a plotting point immediately before the current plotting point and that between the current plotting point and a point immediately after the current plotting point; a variation memorizing unit for storing a positional variation in a y-axis direction between the current plotting point and the plotting point immediately before the current plotting point which is extracted based on the positional relations calculated by the positional relation calculation unit, wherein when a position of the current plotting point varies from that of the plotting point immediately before, the variation is stored as a current value, although when a position of the plotting point immediately after varies from that of the current plotting point, this variation is stored instead of the above variation, and when the position of the current plotting point does not vary relative to both of the plotting points immediately before and after, a previous value is maintained; an outline creation unit for creating the outline by plotting outline components one after another in accordance with the following rule: a) when the current plotting point and the plotting points immediately before and after are in a horizontally reciprocating relation and these three plotting points are aligned in parallel with the x-axis direction, plotting of an outline component is done at the current plotting point or a plotting point one dot shifted in the x-axis direction from the current plotting point based on the positional variation stored in the variation memorizing unit, and b) when the current plotting point and the plotting points immediately before and after are not in a horizontally reciprocating relation, plotting of an outline component is done at the current plotting point, a plotting point one dot shifted in the x-axis direction from the current plotting point, both the current plotting point and a plotting point one dot shifted in the x-axis direction from the current plotting point, or neither point; and a painting-out unit for painting pixels between an odd-numbered intersection of the outline and a horizontal scanning line and an even-numbered intersection of the outline and the horizontal scanning line, inclusive of the pixel at the odd-numbered intersection but exclusive of the pixel at the even-numbered intersection.

Preferably the outline creation unit includes a table indicating the rule for plotting outline components one after another.

FIG. 12 shows a principle of creating an outline and FIG. 13 shows a table to be referred to when creating the outline. With reference to these figures, the operation of the above-described image processing apparatus is described below.

For example, from the outline vectors shown in FIG. 12A (i), plotting points as shown in the right portion of FIG.12A (i) are calculated by the plotting point calculation unit in accordance with the Bresenham algorithm. Then, with respect to each plotting point calculated by the plotting point calculation units, the positional relation calculation unit calculates the positional relation of a current plotting point to a plotting point one point before the current plotting point, and to a plotting point one point after (It is to be noted that in this specification and the claims, phrases such as "a point immediately before", "a point one point before", "a point immediately after", or "a point one point after" refer to a point to be processed immediately before or after a specific point. Therefore, an end point of a vector is a point immediately before a starting point of another vector. In this specification, "previous" or "back" is also used to refer to a point immediately before, and "next" to refer to "immediately after"). For instance, speaking of a point "b" shown in (iii) of FIG. 12A, there is a negative variation in the x direction from a point "a" immediately before the point "b", and no variation in the y direction. The next point "c", has a negative variation in the x direction from the point "b", and a positive variation in the y direction. Therefore, the positional relation of the plotting point "b" to the previous and next points "a" and "c" becomes −, 0, − and +. Next, the outline creation unit plots the point "b" as it is, based on the positional relation obtained and the table shown in FIG. 13. On the other hand, the position variation memorizing unit stores (+) in a flag FFDY because the point "c" is varied in the positive y direction relative to the point "b". This value is held until a negative variation in the y direction takes place as shown in (xi) of FIG. 12B and then changed into (−) The value stored in the flag FFDY is referred to when the positional relation of a plotting point such as a point "j" in (x) of FIG. 12B is in a horizontally reciprocating relation of +, 0, − and 0 relative to the previous and next points "i" and "k". In this case, the outline creation unit plots a point one dot shifted in the x direction from the point "j" in accordance with the value of the flag FFDY and the table shown in FIG. 13. Thereafter, a similar processing is carried out to process all plotting points and finally an outline is created as shown in (xvii) of FIG. 12C. Then, the painting-out unit starts painting at the odd-numbered intersections between the outline created by the outline creation means and each horizontal scanning line and stops painting at the even-numbered-intersection so as to paint out pixels between the odd-numbered and even-numbered intersections, inclusive of a pixel at the odd-numbered intersection, but exclusive of a pixel at the even-numbered intersection.

Accordingly, no errors will be caused in the painting-out operation, and moreover a painted figure is free from deformations from its original figure.

Furthermore, an outline created by the apparatus of the present invention will not cause any painting-out errors even when the outline is created from outline vectors which have undergone a variable magnification and/or rotarion processing.

Furthermore, according to a second aspect of the present invention, in an image processing method by which a contour of a figure is represented with a series of clockwise outline vectors, a sense of each vector being set such that the figure be painted out by painting a left side of the vector, and then, an outline is created from the outline vectors, and the figure is painted through a scanning operation in an x-axis direction by starting a painting operation at an odd-numbered intersection of the outline and a horizontal scanning line and suspending the painting operation at an even-numbered intersection of the outline and the horizontal scanning line during the scanning operation, thereby painting pixels between the odd-numbered intersection and the even-numbered intersection, inclusive of the pixels at the odd-numbered intersection but exclusive of the pixel at the even-numbered intersection, the image processing method comprises the steps of (a) creating the outline successively without plotting a first pixel of the outline; (b) deciding whether to plot the first pixel or not based on a positional relation between the first pixel and the next pixel and a, positional relation between a last pixel being identical to the first pixel and a pixel immediately before the last pixel; and (c) further deciding whether to plot a pixel one dot shifted in the x-axis direction from the first pixel or not when the plotting of the first pixel is decided.

According to the above method, the contour of a figure is represented with outline vectors connected with each other clockwise, and the sense of each outline vector is set such that the figure is painted out by painting the left-hand side of the vector. Then, pixels for an outline to be created, exclusive of the first pixel of the outline, are sequentially plotted based on the outline vectors. After that, whether the first pixel should be plotted or not is selected based on the positional relation between said first pixel and the next pixel and the positional relation between the last pixel of the outline (the same point as the first pixel) and the pixel immediately before. When the plotting of the first pixel is selected, whether a pixel one dot shifted from the first pixel in the x-axis direction should be plotted or not is selected. In this way, the creation of the outline is completed. Then, by scanning in the x-axis direction, the painting-out operation is started at an odd-numbered intersection between the outline and each of horizontal scanning lines, with the painting operation being suspended at an even-numbered intersection therebetween. By the above-described operation, the painting-out errors can be eliminated even in the case of applying a rotating processing to the outline because the processing of a starting point (the first pixel) of the outline is effected completely and easily.

Furthermore, in order to accomplish the above-described object, according to a third aspect of the present invention, in an image processing method by which a contour of a figure is represented with a series of clockwise outline vectors, a sense of each vector being set such that the figure be painted out by painting a left side of the vector, and then, an outline is created from the outline vectors, and the figure is painted through a scanning operation in an x-axis direction by starting a painting operation at an odd-numbered intersection of the outline and a horizontal scanning line and suspending the painting operation at an even-numbered intersection of the outline and the horizontal scanning line during the scanning operation, the image processing method is characterized in that prospective pixel points are calculated from each outline vector in accordance with Bresenham algorithm; that every prospective pixel on each outline vector is judged one after another whether to be plotted or not based on the following rule: a) when the outline vector is a vector increasing or decreasing both in the x-axis direction and in a y-axis direction and with an absolute value of a variation amount in the x-axis direction being larger than an absolute value of a variation in the y-axis direction, and when a currently obtained prospective pixel point varies in y-ordinate relative to a prospective pixel point immediately before the currently obtained prospective pixel point, the prospective point immediately before is plotted, on the other hand, when the currently obtained prospective pixel point does not vary in y-ordinate relative to the prospective pixel point immediately before, the prospective pixel point immediately before is not plotted, b) when the outline vector is a vector increasing in the x-axis direction and decreasing in the y-axis direction or a vector decreasing in the x-axis direction and increasing in the y-axis direction and with an absolute value of a variation amount in the x-axis direction being larger than that in the y-axis direction, and when a currently obtained prospective pixel point varies in y-ordinate relative to a prospective pixel point immediately before the currently obtained prospective pixel point, the currently obtained prospective pixel point is plotted, on the other hand, when the currently obtained prospective pixel point does not vary in y-ordinate relative to the prospective pixel point immediately before, the currently obtained prospective pixel point is not plotted, and c) when the outline vector is a vector in which an absolute value of a variation amount in the x-axis direction is not larger than an absolute value of a variation amount in the y-axis direction, all prospective pixel points are plotted; and that the outline is created from the plotted prospective pixel points.

According to this image processing method, the contour of a figure is represented with outline vectors connected with each other, and the sense of each outline vector is set such that the figure is painted out by painting the left-hand side of the vector. Whether the absolute value of a variation amount in the x-axis direction is larger than that in the y-axis direction or not is judged for each outline vector. When the absolute value of the variation amount in the x-axis direction is not larger than that in the y-axis direction, an outline (an outline component in the strict sense) is created in accordance with the Bresenham algorithm, using the y-axis as a major axis, while when the absolute value in the x-axis direction is larger than that in the y-axis direction, the following processing is effected with the x-axis as the major axis. That is, when the outline vector increases or decreases both in the x-axis direction and in the y-axis direction, a prospective pixel point is obtained in accordance with the Bresenham algorithm, and when the currently obtained prospective pixel point varies in the ordinate relative to a prospective pixel point immediately before, the point immediately before, namely, the previous point is plotted instead of the current one. On the other hand, if the current prospective pixel point does not vary in the ordinate relative to the previous point, the previous point is not plotted.

Meanwhile, when the outline vector is a vector increasing in the x-axis direction and decreasing in the y-axis direction or a vector decreasing in the x-axis direction and increasing in the y-axis direction, prospective pixel points are obtained in accordance with the Bresenham algorithm. When a newly obtained prospective point varies in the ordinate relative to a prospective pixel point immediately before, the newly obtained pixel point is plotted. On the other hand, when the newly obtained prospective pixel point does not vary in the ordinate relative to the previous point, the newly obtained pixel point is not plotted. The prospective pixel points are discriminated one by one whether to be plotted or not in the above manner so as to create the outline. Then, by the scanning operation in the x-axis direction, the painting-out operation is started at an odd-numbered intersection between the outline and a horizontal scanning line and suspended at a even-numbered intersection therebetween.

Through the above-described processing, the outline can be created without a filter processing as conventionally done, thus the entire processing time is reduced.

Furthermore, according to a fourth aspect of the present invention, in an image processing method by which a contour of a figure is represented with a series of outline vectors, a sense of each vector being set such that the figure be painted out by painting a left side of the vector, and then, an outline is created from the outline vectors, though in the case of contracting the figure, new outline vectors are created by contracting the outline vectors, then whether a variation amount in a y-axis direction of each outline vector is negative, zero, or positive is judged, thereafter, when the variation amount is negative, plotting of an outline is effected in accordance with Bresenham algorithm, when the variation amount is zero, the outline plotting is not effected, and when the variation amount is positive, the outline plotting is effected at a position one dot shifted in an x-axis direction from a position determined according to the Bresenham algorithm, then the figure is painted through a scanning operation in the x-axis direction by starting a painting operation at an odd-numbered intersection of the outline and a horizontal scanning line and suspending the painting operation at an even-numbered intersection of the outline and the horizontal scanning line during the scanning operation, thereby painting pixels between the odd-numbered intersection and the even-numbered intersection, inclusive of the pixels at the odd-numbered intersection but exclusive of the pixel at the even-numbered intersection, the image processing method is characterized in that when of contracting the figure, besides effecting the painting-out operation, painting of pixels on a segment connecting a starting point and an end point of the new outline vector obtained by the contraction is carried out.

According to the image processing method, when a figure is contracted, the painting-out operation is effected based on an outline obtained through the contraction at first. In addition, a starting point and an end point of each of outline vectors obtained through the contraction are calculated, and pixels on a segment connecting the starting and end points are painted.

Therefore, even when a horizontal side of an area represented by the outline of a figure overlaps, as a result of the contraction, a horizontal side of another area represented by the outline of another figure, no painting-out errors of the figures will take place.

Furthermore, according to a fifth aspect of the present invention, in a method for judging a transition direction of integer vectors, which have their respective dimensional elements composed of $+1$, $-1$ or 0 and constitute a polygon when connected to each other, wherein the integer vectors are successively received one after another, and a transition direction is judged with respect to an end point of each integer vector on the polygon, the method comprises the steps of (a) storing a predetermined number of first received integer vectors out of all received integer vectors; (b) temporarily storing a newly received integer vector and the same number of previously received integer vectors as the first received integer vectors; and (c) judging the transition direction of the end point of the integer vector based on the stored integer vectors, when this judgement of the transition direction of the end point proves impossible, a further judgement is effected based on a new integer vector received next and integer vectors stored when this new integer vector is received.

According to the method for judging a transition direction of an integer vector of the present invention, it is possible to judge the transition direction of each point on a side of polygons of various shapes, and therefore it is possible to obtain more accurate computer graphics without an erroneous image painting.

BRIEF DESCRIPTION OF THE DRAWINGS

The present invention will become more fully understood from the detailed description given below and the accompanying drawings which are given by way of illustration only, and thus are not limitative of the present invention, and wherein:

FIGS. 7A and 7B show a case where a contracted outline in a conventional example becomes an outline causing the painting-out errors;

FIGS. 8A through 8C show deformations of a figure caused by a conventional method;

FIGS. 9A through 9D show typical examples of outlines causing the painting-out errors in case of using said conventional method;

FIG. 13 is a table used for the creation of the outline in the preferred embodiment;

FIGS. 14A through 14C and FIGS. 15A through 15C are drawings for explaining the start-point processing in a second preferred embodiment of the present invention;

FIG. 23A and FIGS. 24A through 24D show outlines created by the method according to a fourth embodiment of the present invention, wherein black dots and the numeral 1 represent individual components of the outlines;

FIG. 23B and FIGS. 25A through 25D show figures painted out based on the corresponding outlines of FIG. 23A and FIGS. 24A through 24D;

FIG. 28 is a drawing for explaining the painting-out operation in the fourth embodiment of the present invention;

FIGS. 29A and 29B show an example of a figure which, when contracted, causes the painting-out errors in accordance with a conventional image processing method;

FIGS. 30A-30B show outlines obtained after contracting the outline vectors obtained from the figures of FIG. 29A by a conventional method;

FIG. 31 shows the result of the painting-out operation effected based on the outline shown in FIG. 30A;

FIG. 32A and 32B show polygons given by integer vectors;

FIG. 33 shows the positional relations of the vectors temporarily stored by a method according to a fifth embodiment of the present invention;

FIG. 34 shows the positional relations of the first three vectors of a polygon processed by the method of the fifth embodiment;

DETAILED DESCRIPTION OF THE PREFERRED EMBODIMENTS

Figure 10:
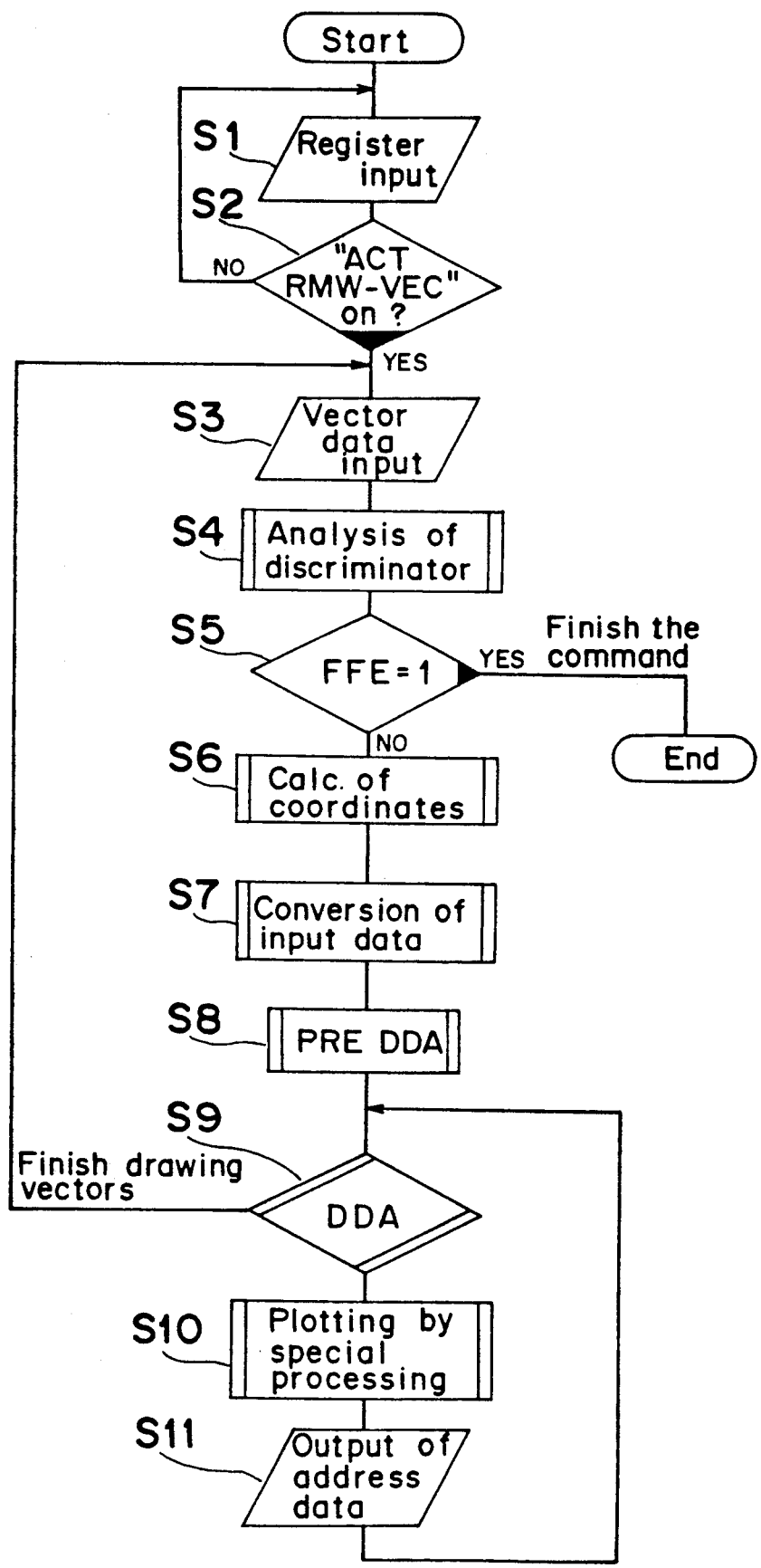
FIG. 10 is a flow chart showing the contents of the processing for creating an outline from outline vectors in an image processing apparatus according to a first preferred embodiment of the present invention.

FIG.10 is a flow chart showing the contents of the processing for creating an outline from outline vectors by an image processing apparatus according to a first embodiment of the present invention. The processing will be described below in detail in accordance with FIG. 10.

First, in the "register input" operation at step S1, the initial setting of various values such as an address of a starting point of an outline to be created, a rotation angle, an inclination angle, a variable magnification rate, etc. is effected. At step S2, "ACT RMW-VEC" bit which is an execution command is turned on to start the creation of an outline.

Vector data is inputted at step S3. This vector data is composed of a differential data and a discriminator. The analysis and judgement of the discriminator is effected at steps S4 and S5, and the following procedure is repeated until the discriminator indicating the end of the command comes out.

First, at step S6, a coordinates calculation processing of adding the differential data to the origin and offset values is effected. This is a processing before the processing of rotation, inclination and variable magnification, and since the vector data is represented in integers, no errors are accumulated. Next at step S7, the conversion of the input data relating to the rotation, inclination, and variable magnification is effected. This operation is effected for each vector (the starting point and end point). "PRE DDA" of step S8 is a portion called the preliminary processing of the Bresenham algorithm. Here, various calculations on a major axis, a minor axis, etc. are effected. The next step S9 is a DDA processing for renewing a current pointer before "plotting by special processing" is effected at step S10. At step S10, the plotting is not made on a point to be obtained by the normal Bresenham algorithm, but on a point obtained by applying the special processing as described later to the point to be plotted, and the address of the actually plotted point and data as described later are stored in a memory. After the above operations are effected on one vector, the flow is retuned to step S3 and a new vector is read out.

The above-described operations are repeated till all outline vectors are processed, and the processing is terminated when the discriminator indicating the end of the command is inputted.

Figure 11:
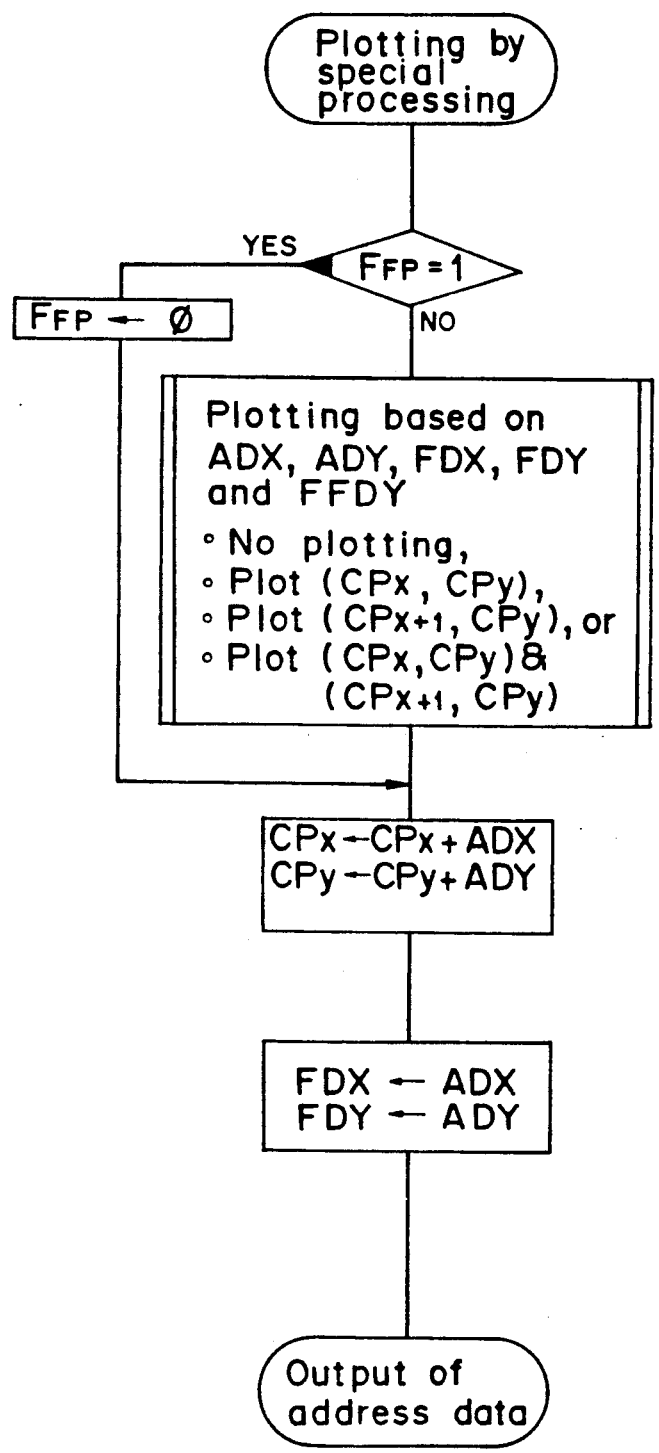
FIG. 11 is a flow chart showing the details of the "plotting by special processing" portion in the above flow chart.
Figure 12C:
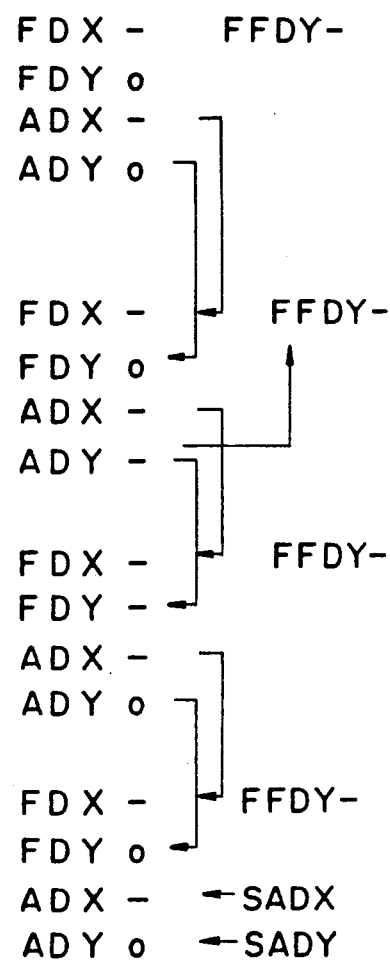
FIG. 12 (12A through 12C) shows an example of the outline creation in the preferred embodiment.

The contents of the processing of "plotting by special processing" at step S10 is shown in FIG.11, and an example of this processing is shown in FIGS. 12A, 12B, and 12C, and a table used in this processing is shown in FIG. 13.

Below, the processing of "plotting by special processing" will be described in detail with reference to an example shown in FIG. 12 (FIGS. 12A, 12B, and 12C), wherein an outline shown in (xvii) is to be obtained from outline vectors shown in (i).

First, plotting points are calculated from the outline vectors shown in (i) by the normal Bresenham algorithm, the result is as shown on the right-hand side thereof. By applying the following special processing, the outline will be obtained. In FIG.11, the first plot flag ($FF_p$) is first set at "1" so that the initial point is not plotted.

As shown in (ii), a starting point of a current pointer is set at the point a, and the positional relation of the next point b to the point a is obtained. Let the right direction be a positive x-axis direction, and let the downward direction be a positive y-axis direction, the point b decreases relative to the point a in the x direction and does not vary in the y direction. These relations are set respectively in a flag ADX and a flag ADY which are flags for representing the positional relation of a next plotting point relative to a current plotting point. Specifically, the flag ADX is set negative, and the flag ADY is set zero. Moreover, these positional relations are stored in flags SADX and SADY, respectively, which are flags for representing initial values. Specifically, the flag SADX is set negative and the flag SADY is set zero. These values are used in plotting the end point.

Next, by moving the current pointer by (−1,0), the current point $CP(CP_x, CP_y)$ is moved to the point b as shown in (iii). And the values of the ADX flag and ADY flag are copied in FDX flag and FDY flag which are flags for representing a positional relation of a current plotting point to a point immediately before the current plotting point, and the positional relation of the next point c relative to the point b is set in the ADX flag and ADY flag. That is, FDX is (−), FDY is (0), ADX is (−), ADY is (+). And referring to the table in FIG. 13, since in the case of (−0 − +), a current point is to be plotted as it is, the point b is plotted at the current position. At the same time, since the current value of ADY is other than 0, the value is copied in a FFDY flag. This FFDY flag stores the variation condition (+ or −) if the position of a plotting point has varied in the y direction relative to the position of the previous plotting point. In the case that ADY is 0, the FFDY flag is not renewed, and when ADY takes a value other than 0, the value of the FFDY is renewed to the value of ADY.

Next, at step (iv), the values of ADX and ADY at step (ii) are copied in FDX and FDY, and the positional relation (−, 0) of the point d to the point c is set at ADX and ADY. Then the flags become −, +, − and 0, respectively, and because the combination of (−, +, − and o) is not to be plotted according to the table in FIG.13, the point c is not plotted. Furthermore, since ADY is 0, that is, the y-direction variation of the point d relative to the point c is 0, FDDY is not renewed, but kept positive as it is.

Next, at step (v) the values of ADX and ADY at step (iv) are copied in FDX and FDY, and the positional relations (−, +) of the point e to the point d are set at ADX and ADY, respectively. As a result, the flags become −, 0, − and +, respectively, and referring to the table in FIG.13, the current point is plotted as it is.

Similarly, the point e shown in (vi) is plotted as it is, and the points f, g, and i shown in (vii), (viii), and (ix) of FIG. 12B, respectively, are not plotted. Meanwhile, with respect to the point j shown in (x), because the flags represent +, 0, − and 0, and the value of FFDY is +, the current pointer is shifted by one dot in the x direction and plotted at that position based on the table in FIG. 13. The next point k is not plotted, and the further next point l is shifted one dot in the x direction thus to be plotted. The points m, and n shown respectively at (xiii) and (xiv) in FIG. 12C are not plotted, and the point o shown at (xv) is plotted by shifting one dot in the x direction. The end point p shown at (xvi) is the same point as the starting point a, and the values of ADX and ADY at step (xv) are copied in FDX and FDY, and the values stored in SADX and SADY at step (i) are copied in ADX and ADY. Then, the flags become −, 0, − and 0, and the point o is not plotted in accordance with the table of FIG. 13.

The outline created in this manner becomes as shown at step (xvii). And the painting-out operation is started at an odd-numbered intersection between this outline and the horizontal scanning lines, and suspended at an even-numbered intersection, so that pixels present between the odd numbered intersection and even-numbered intersection, inclusive of a pixel at the odd-numbered intersection and exclusive of a pixel at the even-numbered intersection, are painted out. As a result, an image shown at (xviii) is obtained. This image is the same as that obtained by plotting the interior of the outline shown at (i).

Although no pattern corresponding to the case (3) of the table in FIG.13 appears in the example of FIG. 12, the case (3) is a case of processing an apex, and in this case both a current point and a point one dot shifted in the x direction from the current point are plotted so as not to cause the painting-out errors. Furthermore, the reason why in the cases of (1) and (2) of the table in FIG.13, the FFDY flag is used to make a judgement is as follows. In the case that the special processing is effected on a horizontal reciprocating vector, when there is no y-directional variation in a vector immediately before the horizontal reciprocating vector, it is impossible to tell whether a turning point (for example, the point i in (x) of FIG.12B) of the reciprocating vector becomes an odd point or an even point in effecting the painting-out operation. Therefore, by the flag FFDY, whether it is an odd point or an even point is judged so that the painting-out errors may not be caused.

Furthermore, the flag $FF_p$ in FIG.11 is to prevent the first point of the contour from being plotted. Because the algorithm according to this embodiment requires the positional information relative to the immediately preceding point, the first or starting point can not be plotted. Therefore, the positional relation between the first point and the next point is stored in a register (not shown). In the outline, the first point and the last point become the same point because the outline never fails to be closed. Therefore, when the last point is plotted, based on both the positional relation between the last point and the point immediately before the last point, and the stored positional relation between the first point and the next point, the plotting is effected by the above-described method.

The calculation of the positional relation can be made when the plotting point is calculated in accordance with the Bresenham algorithm. That is, when a vector is plotted, x-directional and y-directional values obtained in the Bresenham algorithm as a pre-processing are latched in respective flags (referred to as $F_{sx}$, $F_{sy}$) And when the error evaluation function e is larger than 0, increment (or decrement) is done with respect to both the major axis and the minor axis, and when the error evaluation function e is 0 or less, increment (or decrement) is done in connection with only the major axis. Therefore, if the error evaluation function e is 0 or less, $F_{sx}$ is entered in ADX, and ADY is set at 0. On the other hand, if the error evaluation function e is larger than 0, $F_{sx}$ is entered in ADX and $F_{sy}$ is entered in ADY. As described above, because the normal Bresenham algorithm is applicable to the calculation of the positional relations, it hardly takes an extra time to do the calculation. Furthermore, as the special processing is handled by referring to the table, a loss of time will hardly take place. As described above, the creation of the outline with no painting-out errors can be effected substantially at the same speed as in the case of using the normal Bresenham algorithm.

The image processing apparatus according to the present embodiment is characterized by its software and therefore its hardware is not shown although it has a central processing unit, a read-only memory for storing the above program, a random access memory, an input device and an output device.

Next, an image processing method according to a second preferred embodiment of the present invention will be described below.

According to the image processing method of the present embodiment, the contour of a figure is represented with the outline vectors connecting in the clockwise rotation direction, and the sense of each outline vector is set such that the figure is painted out by painting the left side of the outline vectors.

In the case of creating an outline from the outline vectors, the outline plotting is successively effected without plotting the first pixel of the outline to be created, and at the same time, the positional relation between the first pixel and the next pixel is stored in a memory. When a pixel to be plotted falls on the first pixel at last, a selection is done as to whether to plot the first pixel or not based on both the positional relation stored in the memory and the positional relation between the first pixel and the immediately preceding pixel. When it is decided that the first pixel is plotted, then, another selection is done as to whether a pixel one dot shifted in the x direction from the first pixel is to be plotted. Based on a result of this selection, an outline is created, and the painting-out operation is started at an odd-numbered intersection between the outline and horizontal scanning lines by the scanning operation in the x direction, and suspended at an even-numbered intersection.

FIGS. 14A, 14B and 14C, and FIG. 15A, 15B and 15C show judgement criteria in effecting the above selections.

FIGS. 14A and 14B show a case where the vector font is such a trapezoid as shown in FIG. 14C, and the point A is selected as a starting point for creating an outline. First, without plotting the point A, a direction vector of the point A which represents a positional relation between the starting point A and the next point B, that is, a vector oriented to the next point B from the point A is calculated. When the sense of said direction vector in the x direction is positive, "1" is stored in a memory address FDX as shown in FIG. 14A, and similarly, when it is zero, "0" is stored, and when it is negative, "−1" is stored. Also, with respect to the y direction, "1", "0", or "−1" is stored in the address FDY similarly to the case of the x direction. In the case of FIG. 14B, as the direction vector of A is positive in the x direction and nil in the y direction, "1" and "0" are stored in FDX and FDY, respectively. Next, outline pixels are successively plotted, and when the plotting operation comes back to the point A being also an end point, the sense of a vector from the preceding point A towards the end point A is stored similarly in the addresses ADX and ADY. In this case, since the sense of the vector is positive in both directions, "1" and "1" are stored in ADX and ADY, respectively. Then, the data stored in the memory become "1, 0, 1, 1" and the end point is plotted.

Meanwhile, FIGS. 15A–15C show a case when the vector font is a triangle as shown in FIG.15C and that the apex A is selected as a starting point for creating an outline. In this case, the data stored in the memory are "−1,1,−1,−1", and the starting point A and a point shifted by one dot in the x direction from point A, in total, two points are plotted. Like this case, when the data is "−1,1,−1,−1", because the apex processing is necessary, two points of the starting point and a point shifted from this starting point in the x direction are plotted.

As explained by way of the above examples, the criterion for deciding whether or not the plotting of the starting point is necessary and the criterion for deciding whether or not the apex processing is necessary are beforehand established for various cases based on the positional relation between the starting point and the next point and the positional relation between the starting point and the immediately preceding point, and in creating the outline, actual positional relations are calculated on the starting point, and the processing of the starting point is effected in accordance with the criteria.

Therefore, in effecting the painting-out operation without painting-out errors, no restrictions are imposed on the starting point, and the starting point can be selected arbitrarily, and the processing of the selected starting point can be effected easily and at a high speed.

Next, a third preferred embodiment of the present invention will be described.

Figure 16A:
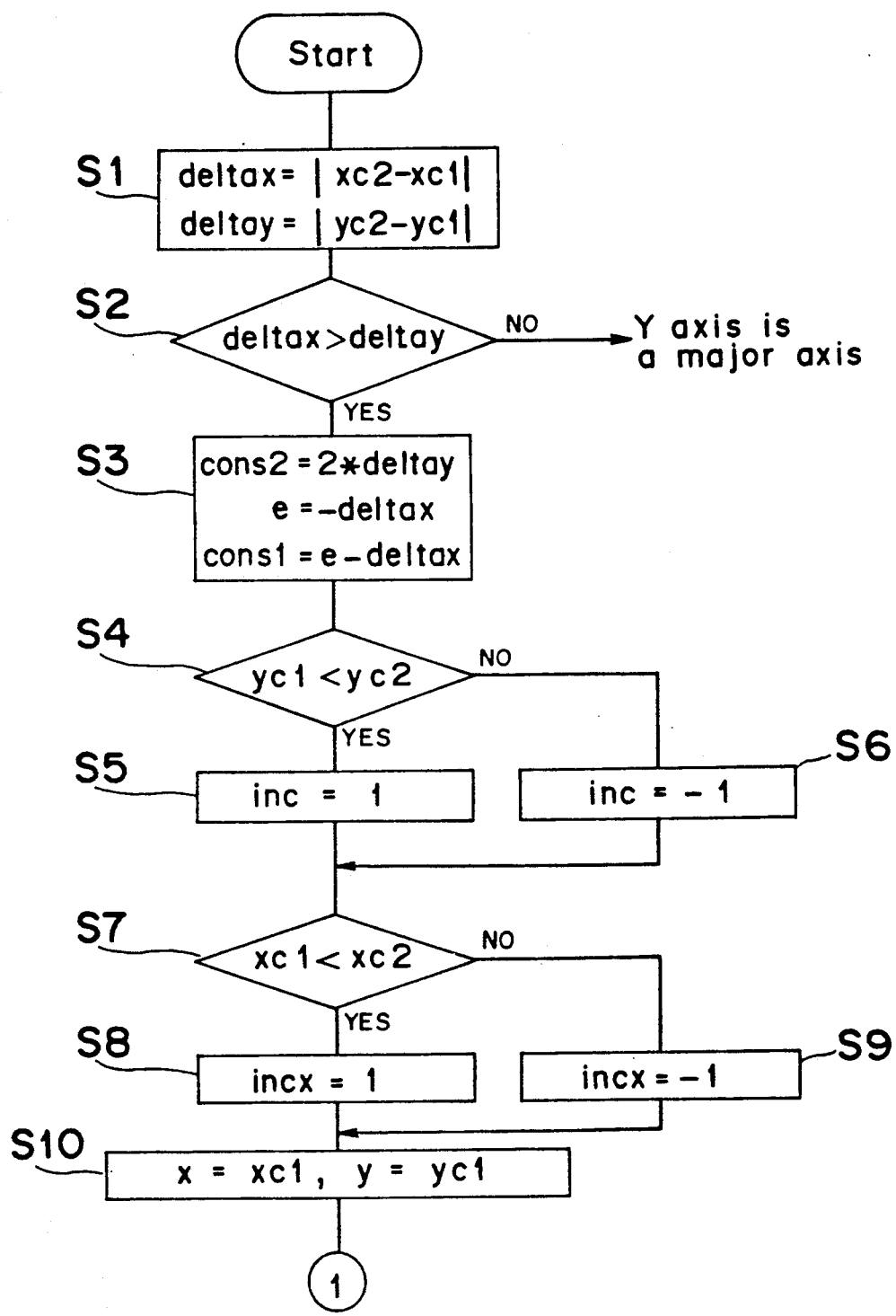
FIGS. 16A through 16C are flow charts showing the contents of the processing for creating an outline from outline vectors in a third preferred embodiment of the present invention.
Figure 16B:
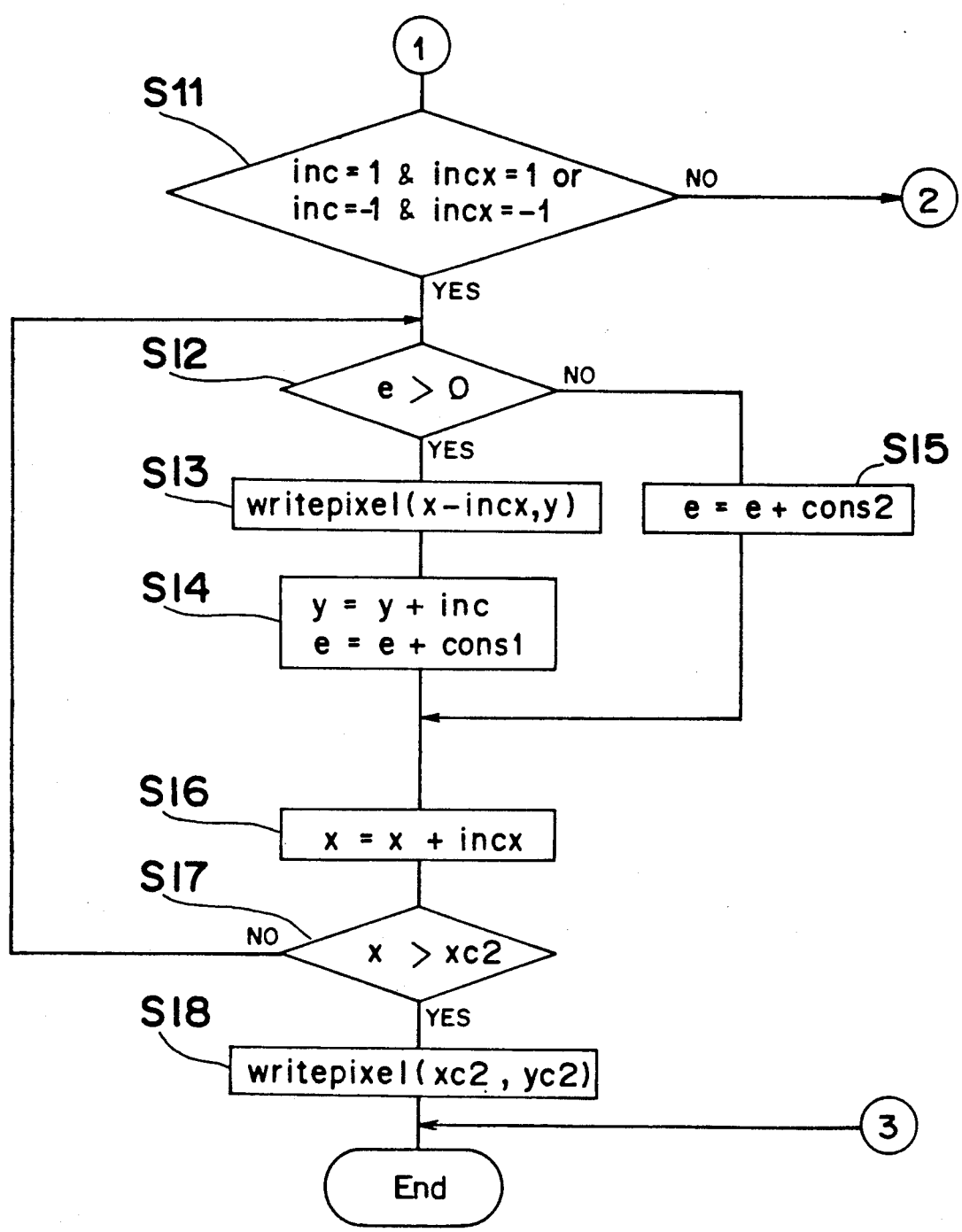
Figure 16C:
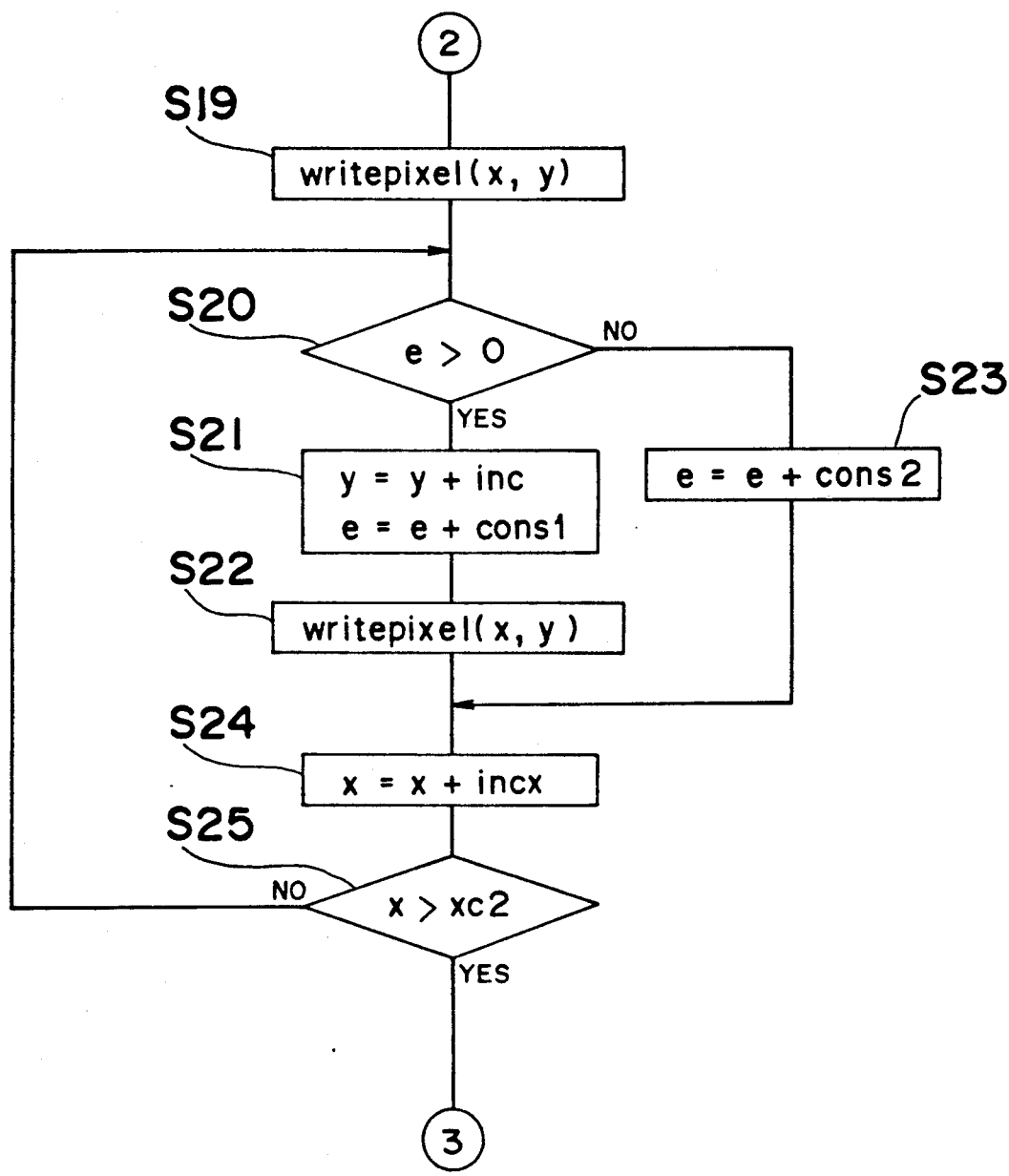
Figure 17:
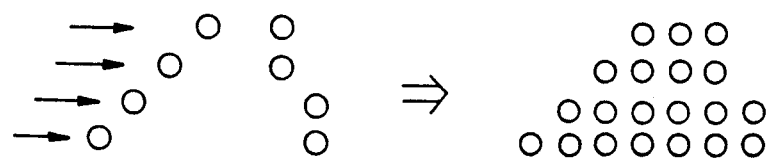
FIG. 17 is an illustration for explaining the switching plotting method (odd-even method)

FIGS. 16A through 16C are flow charts showing the processing contents of the present embodiment using a microcomputer. It is to be noted here that in the case where the y-axis is used as a major axis, an outline is created by the normal Bresenham algorithm.

Figure 18:
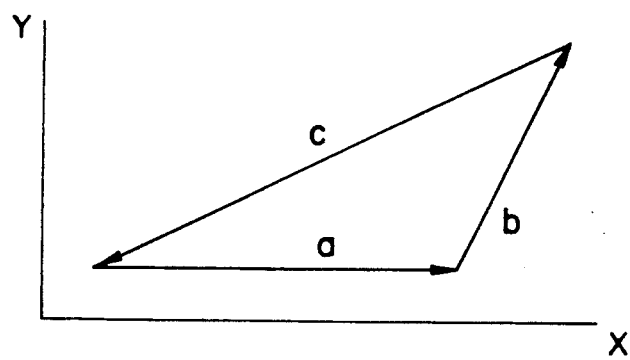
FIG. 18 shows outline vectors of a figure.
Figure 19:
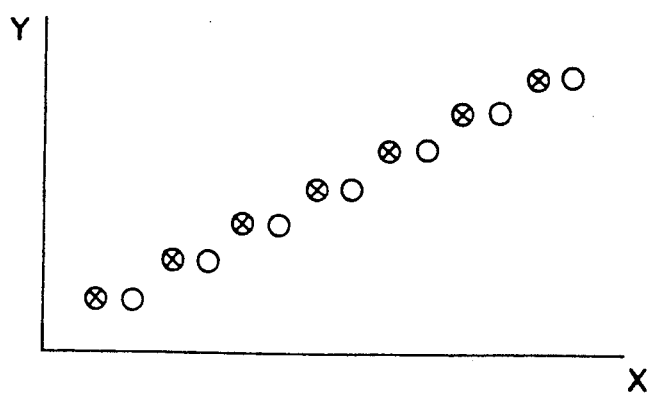
FIG. 19 shows an outline created based on the Bresenham algorithm for the vector C in FIG.18 by a conventional method.
Figure 20:
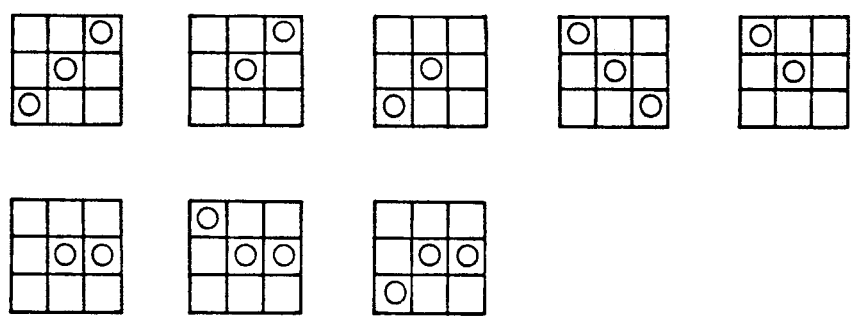
FIGS. 20 and 21 show matrix patterns used for the filter processing in the prior art.
Figure 21:
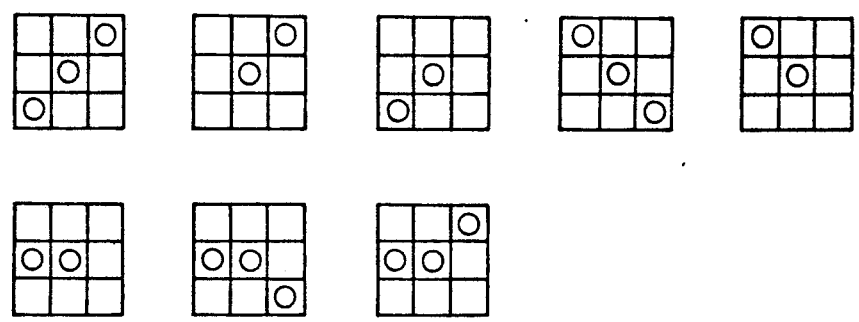
Figure 22A:
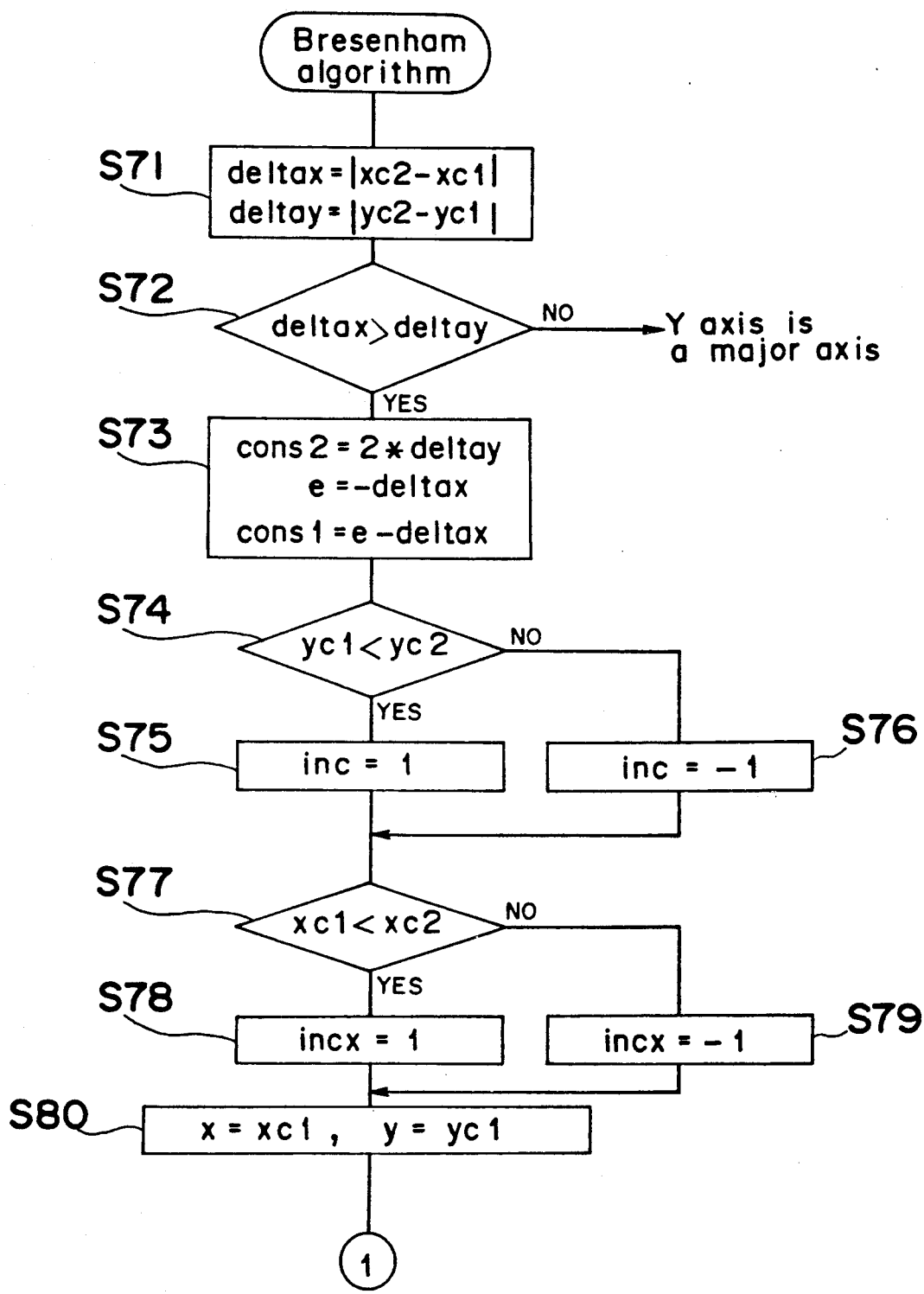
FIGS. 22A and 22B are flow charts showing the contents of the processing for creating an outline from outline vectors by a conventional method.
Figure 22B:
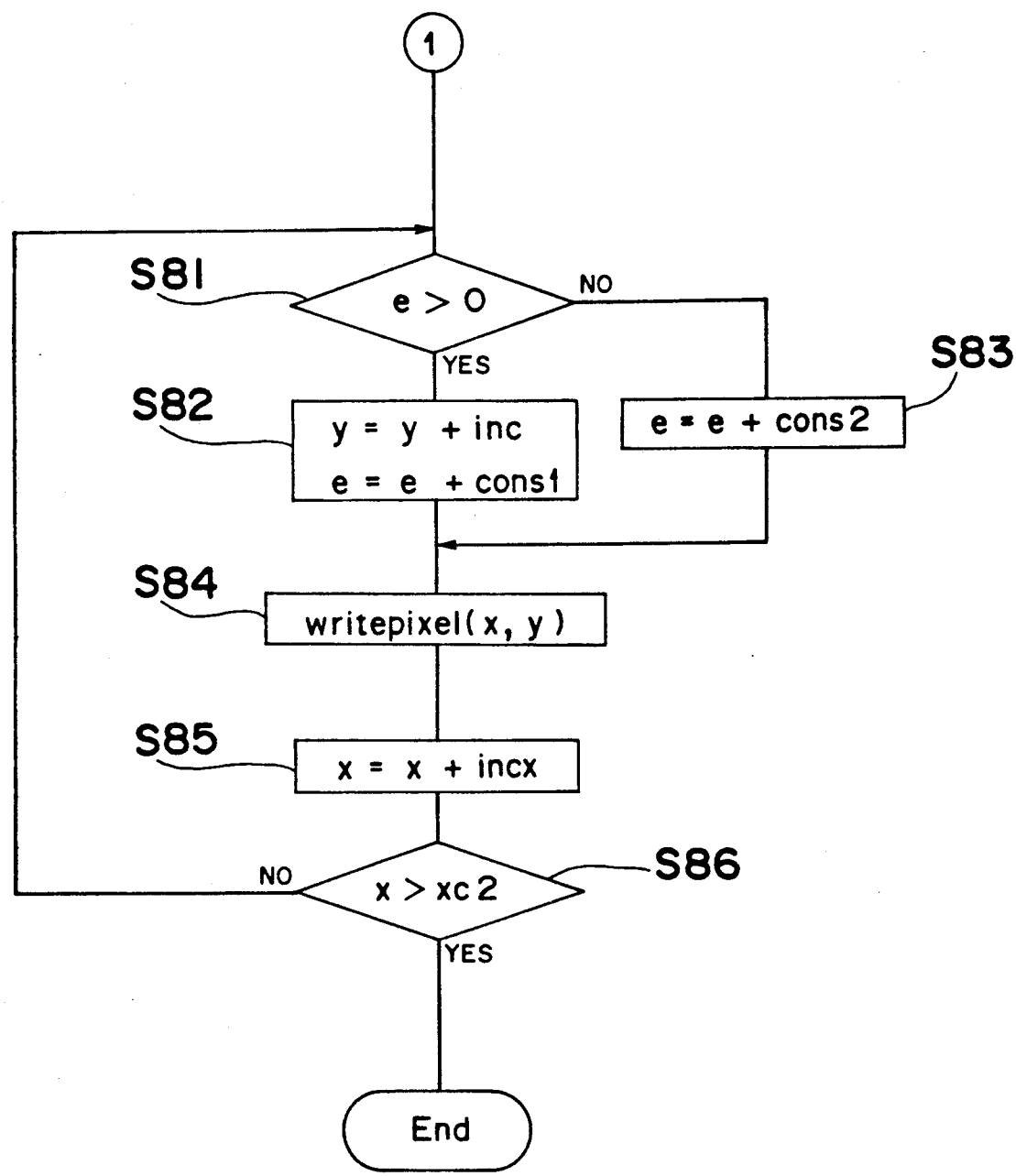

First at step S1, the absolute value of the difference in abscissa between a starting point (xc1, yc1) and an end point (xc2, yc2) of a vector C shown in FIG. 18 is put as "deltax", and that of the difference in ordinate between those points is put as "deltay". At step S2, when "deltax" is larger than "deltay", the flow proceeds to step S3, regarding the x-axis as a major axis. At step S3, an initial value of "e" and constants (cons1,cons2) are set. The value of e is changeable and becomes equal to cons2−deltax), for example, when the flow next proceeds to step S15. The expression (e=cons2−deltax) is made by multiplying 2*deltax on both sides of e=deltay/deltax−0.5 for making the right member an integer and by replacing 2*deltax*e newly with e. That is, e>0 means that the ordinate of an intersection of the vector and a line passing a prospective pixel indication point for the intersection in parallel with the y-axis is closer to the ordinate of an indication point next to the prospective indication point in the negative or positive y-axis direction, than to the ordinate of the prospective pixel indication point. Next, the flow proceeds from step S4 to step S8 or S9, and in accordance with the direction and inclination of the vector, a decision is made as to whether an increment (inc=1) or a decrement (inc=−1) is to be made. And at step S10, the starting point of the vector is made the first pixel indication point.

When the processing from step S1 to step S10 is completed, the flow proceeds to step S11. At step S11, in the case of inc=1 and incx=1, that is, in the case that the vector increases both in the x direction and in the y direction (rising toward the right), or in the case of inc=−1 and incx=−1, that is, in the case that the vector decreases both in the x direction and in the y direction (falling toward the left), the flow proceeds to step S12, and otherwise, it proceeds to step S19.

At step S12, whether e>0 or not is judged. In the case of e>0, that is, in the case where the ordinate of the vector at the abscissa of its prospective pixel indication point is closer to the ordinate of an indication point increased (or decreased) by one increment in the y direction than to the ordinate of the prospective indication point, the flow proceeds to step S13, at which a pixel is plotted at an indication point whose abscissa is increased (or decreased) by one. The flow further proceeds to step S14, at which Y is given one increment or decrement, and e is set as e=e+cons1, and thereafter proceeding to step S16, at which X is given one increment or decrement. On the other hand, when e is not positive at step S12, the pixel is not plotted at that indication point, and after e is made e=e+cons2 at step S15, X is increased (or decreased) by one increment at step S16. And the flow returns from step S17 to step S12, and the same processing is repeated till the end point of the vector is reached. Because a pixel for the end point is not plotted through the above procedure, step 18 is arranged such that the pixel is plotted without failure.

At step S19, on the other hand, after plotting the first pixel, the flow proceeds to step S20 and the judgement as to whether e>0 or not is effected. In the case where e>0 holds, the flow proceeds to step S21, wherein y is increased (or decreased) by one increment, and at the same time, e=e+cons1 is established, and then the pixel is plotted at an indication point wherein y is increased (or decreased) by one increment. Then, the flow proceeds to step S24 to give an increment or decrement to x. On the other hand, when e>0 does not hold at step S20, the pixel is not plotted at that indication point, but after establishing e=e+cons2 at step 23, x is given one increment (or decrement). Then, the process returns from step S25 to step S20, and thereafter the same processing is repeated till the end point of the vector.

According to this embodiment, a similar outline to that conventionally obtained by using a 3-by-3 mesh filter can be created through the above-described processing. Accordingly, the time for such a filter processing is not required, and a high-speed processing can be achieved.

Next, a fourth embodiment of the present invention will be described. FIG. 23A and FIGS. 24A through 24D are outline examples created by the following image processing method, and correspond respectively to FIG. 4A and FIGS. 9A through 9D.

As shown by these outlines, this image processing method is arranged so that when the y-directional variation of an outline vector is negative, an outline is created according to the Bresenham algorithm, when the y-directional variation is zero, the outline is not created, and when the y-directional variation is positive, the outline is plotted at a position one dot shifted in the x-axis direction from the point determined by the Bresenham algorithm.

By scanning in the x-axis direction, the painting-out operation is started at an odd-numbered intersection between the outline and each horizontal scanning line and suspended at an even-numbered intersection, so that pixels between the odd-numbered intersection and the even-numbered intersection, inclusive of the pixel at the odd-numbered intersection and exclusive of the pixel at the even-numbered intersection, are painted out. By this painting-out operation, the figures defined by the above-described outlines are painted out as shown in FIG. 23B and FIGS. 25A through 25D.

Figure 1:
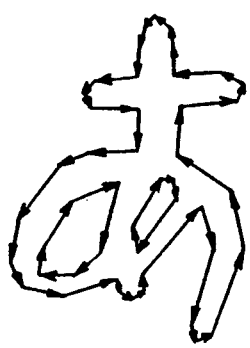
FIG.1 shows outline vectors.
Figure 2A:
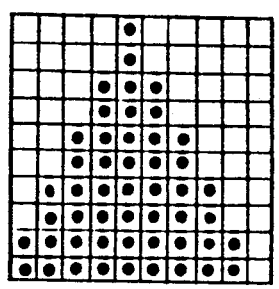
FIGS. 2A and 2B, and FIGS. 3A and 3B are illustrations for explaining the painting-out of a figure by the scan fill method.
Figure 2B:
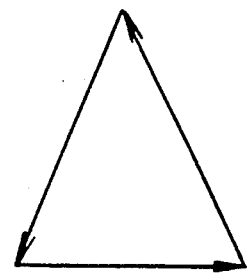
Figure 3A:
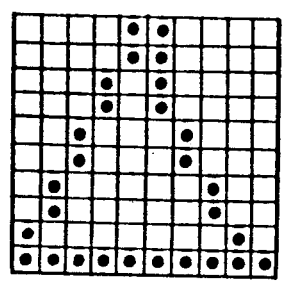
Figure 3B:
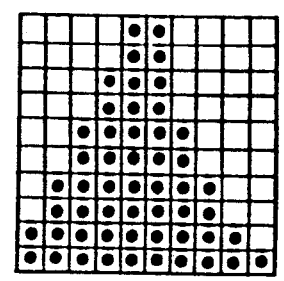
Figure 4A:
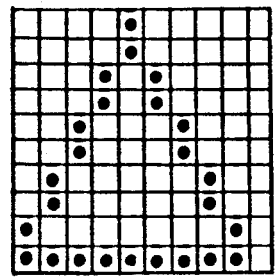
FIGS. 4A and 4B, FIGS. 5A and 5B, and FIGS. 6A and 6B show outlines created by a conventional image processing method, and the figures suffering from painting-out errors.
Figure 4B:
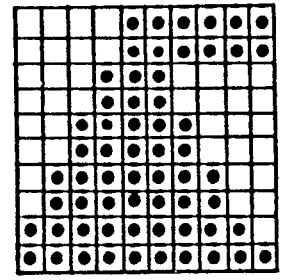
Figure 5A:
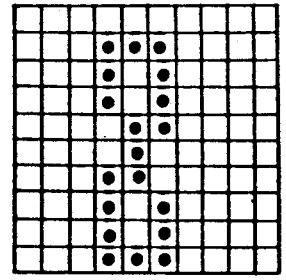
Figure 5B:
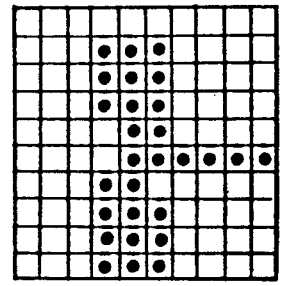
Figure 6A:
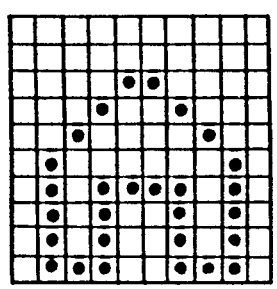
Figure 6B:
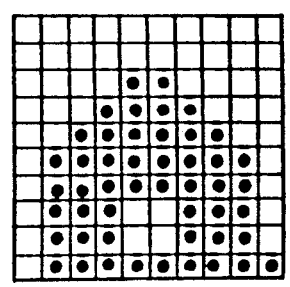

Therefore, such painting-out errors as shown in FIG. 4B, FIG. 5B, and FIG. 6B are not caused and such deformation of the figure as shown in FIGS. 8B and 8C does not take place.

Figure 26:
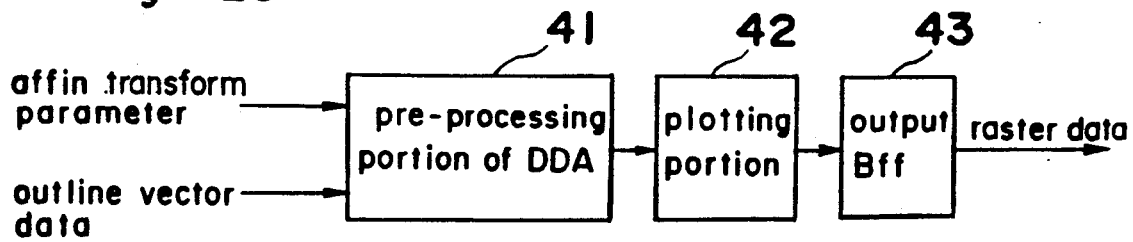
FIG. 26 is a block diagram showing a circuit for creating an outline from outline vectors.
Figure 27:
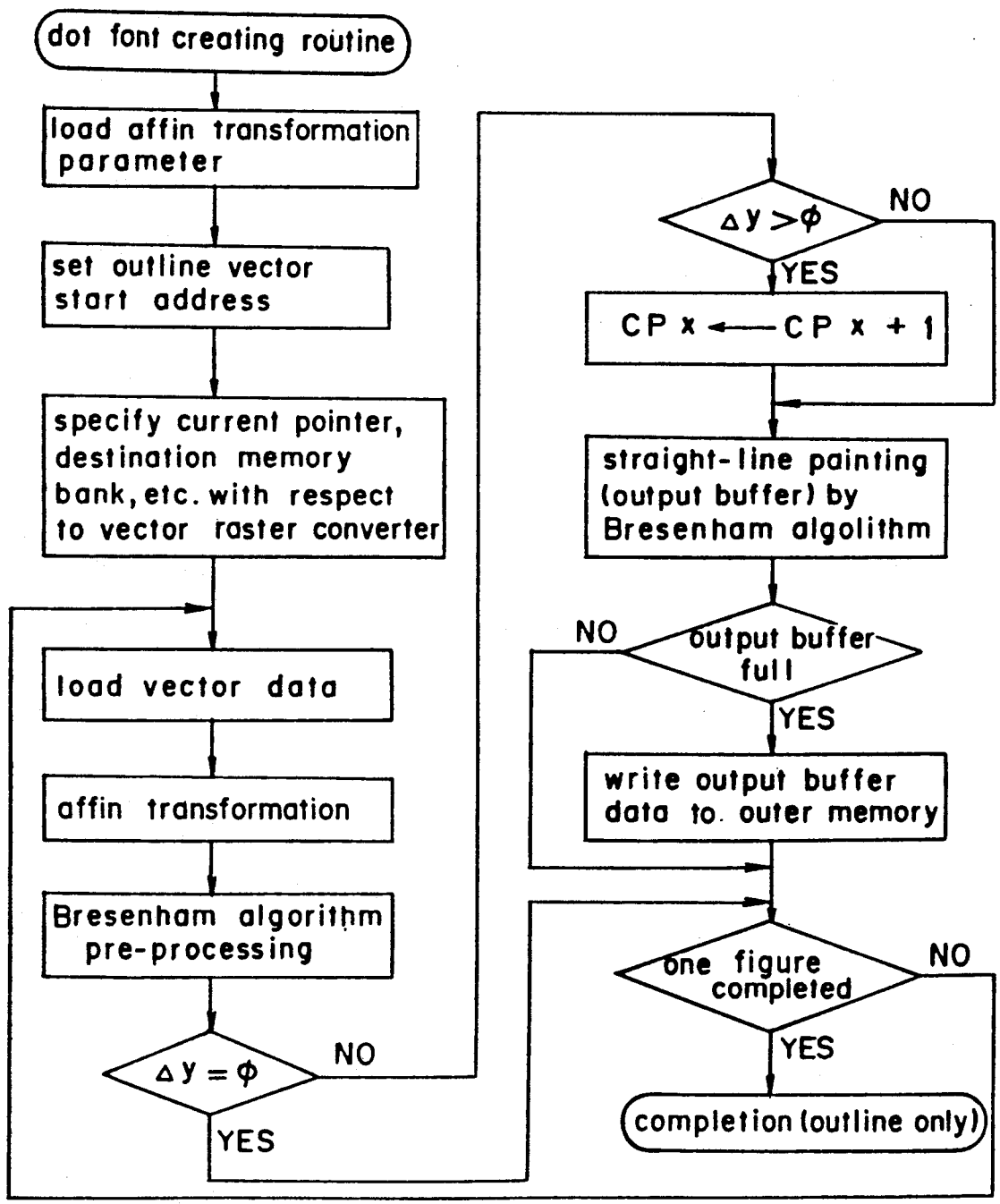
FIG. 27 is a flow charts showing the operation of the circuit of FIG. 26.

FIG. 26 is a block diagram showing a circuit for creating an outline (raster data) from outline vector data, and FIG. 27 is a flow chart showing the operation of this circuit.

In FIGS. 26 and 27, first, outline vector data stored in a memory such as mask ROM, and affine transformation parameters such as sinθ, cosθ, Sx (x-directional variable magnification), and Sy (y-directional variable magnification) are inputted into a pre-processing portion 41 of a DDA (digital differential analyzer). This pre-processing portion 41 of the DDA effects the affine transformation such as rotation, variable magnification, inclination, etc. of an outline vector based on the affine transformation parameters by using a built-in multiplier and adder. The outline vector data after completion of said affine transformation processing is converted into the x, y absolute addresses, and then, the preliminary processing of the Bresenham algorithm is effected. In this pre-processing of the Bresenham algorithm, when Δy is positive, a current pointer is one dot shifted in the x-direction, when Δy is zero, the plotting is not effected, and when Δy is negative, only the pre-processing of the Bresenham algorithm is effected, but the current pointer is not shifted. Next, this processed data is outputted to the Bresenham plotting portion 42.

This Bresenham plotting portion 42 writes data outputted from the pre-processing portion 41 of the DDA into an internal output buffer of the Bresenham plotting portion 42 in accordance with the Bresenham algorithm. At this time, because the processing based on Δy has already effected in the pre-processing portion 41 of the DDA, it is not necessary to do it in the Bresenham plotting portion 42.

The data written in the internal buffer of the Bresenham plotting portion 42 is transferred to an output buffer 43, and from this output buffer 43 the outline (raster data) is outputted.

Meanwhile, when outline vectors created, for example, from such figures A and B as shown in FIG. 29A, are contracted through the affine transformation, the contracted outline vectors will give outlines as shown in FIG. 30A. That is, the contours of the figures A and B shown in FIG. 29A are represented respectively, by one starting point and four vectors as shown in FIG. 29B. And when they are reduced to a scale of ¼, the starting points and vectors become as shown in FIG. 30B. From these contracted vectors, the outlines shown in FIG. 30A are obtained. When the painting operation is effected based on these outlines, a figure as shown in FIG. 31 is obtained. As is evident from this figure, the pixels at y=5, x=4, 5, 6, and 7 are left unpainted. This is because the outlines for the figures A and B when contracted are partially overlapped at a row of y=5, and the overlapped pixels are not painted out.

Next, from the starting points and vectors of the figures A and B shown in FIG. 29A, the coordinates of starting points and end points of the vectors are calculated. Putting the coordinate points in figure A as A1, A2, A3 and A4, and the coordinate points in figure B as B1, B2, B3 and B4, each coordinate point becomes as follows.

| FIG. A | FIG B |
|---|---|
| A1 = starting point = (16,22) | B1 = starting point = (8,8) |
| A2 = A1 + (20,0) = (36,22) | B2 = B1 + (20,0) = (28,8) |
| A3 = A2 + (0,8) = (36,30) | B3 = B2 + (0,12) = (28,20) |
| A4 = A3 + (−20,0) = (16,30) | B4 = B3 + (−20,0) = (8,20) |

Next, when these coordinate values are multiplied by ¼, and decimal fractions are cut off, then the following coordinates are obtained.

| FIG. A | FIG. B |
|---|---|
| A1' = starting point = (4,5) | B1' = starting point = (2,2) |
| A2' = (9,5) | B2' = (7,2) |
| A3' = (9,7) | B3' = (7,5) |
| A4' = (4,7) | B4' = (2,5) |

With respect to the figure A, pixels on the segments connecting coordinate points A1' and A2', A2' and A3', A3' and A4', A4' and A1' are painted out, and with respect to the figure B, pixels on the segments connecting coordinate points B1' and B2', B2' and B3', B3' and B4', and B4' and B1' are painted out. As a result, the pixels marked with a circle in FIG. 28 are painted out, thus the unpainted pixels shown in FIG. 31 can be painted out.

As is clear from the foregoing description, according to the image processing method of the present invention, in the case of contracting a figure, the painting-out operation is effected based on the outline obtained by the contraction, and at the same time, by obtaining the starting points and end points of outline vectors obtained through the contraction, pixels on the segments connecting these start and end points. Therefore, even when, as a result of the figure contraction, one horizontal side of the area represented by the outline of one figure overlaps the horizontal side of the area represented by the outline of another figure, no painting-out errors of figures will take place.

Below, a fifth embodiment of the present invention will be described.

FIGS. 32A and 32B show examples of a polygon given by two-dimensional integer vectors. These integer vectors may take such values as (−1,1), (1,0), but do not take (0,0). Besides, the polygon is created by successively connecting these integer vectors in such a manner the left side of each integer vector constitutes the inside of the polygon. When a polygon has a hole therein, the hole is represented by writing another polygon inside the said polygon as shown in FIG. 32B. Any polygon is assumed to be closed without fail. Because a large memory area is necessary to hold all vectors constituting a polygon, vectors are arranged to be given one by one.

Figure 35A:
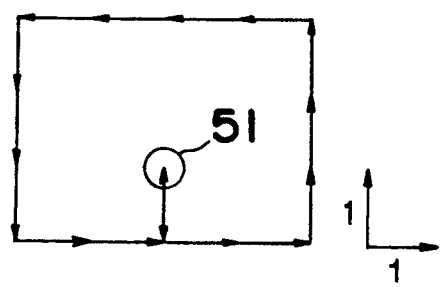
FIGS. 35A and 35B show examples of a polygon which can not be judged with two vectors.
Figure 35B:
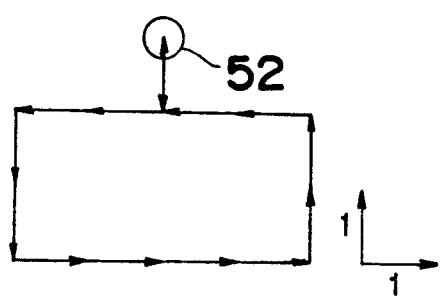
Figure 36:
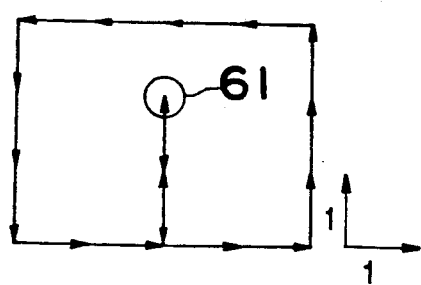
FIG. 36 shows an example of a polygon which can not be judged even with four vectors.

In the case of painting out the interior of a polygon based on its integer vectors, it is necessary to judge how each of points on the sides of the polygon is situated in the entire flow, specifically, whether the point is on a straight line, at a turning point, inside of the polygon (see point 51 in FIG. 35A and point 61 in FIG. 36), or outside of the polygon (see point 52 in FIG. 35B).

In the present embodiment, out of the received integer vectors, the first three integer vectors are stored in a memory, and at the same time, a newly received integer vector and three integer vectors previously received are temporarily stacked.

FIGS. 33 and 34 show positions where the received vectors are stored in a memory area.

CX, CY in the memory area are places to stack a newly received vector, and $IX_i$, $IY_i$ (i=1,2,3) are respectively places to stack previously received vectors. In other words, a new vector is received as shown in FIG. 33, the data shifting is effected like $CX,CY \rightarrow IX_1, IY_1 \rightarrow IX_2, IY_2 \rightarrow IX_3, IY_3$, and the newly received vector is stacked in CX,CY. And the vector stacked at $IX_3, IY_3$ is not held after receiving a new vector. That is, the memory contents in CX,CY, $IX_i,IY_i$ are renewed each time a new vector is received.

$JX_i, JY_i$ (i=1,2,3) are where the first three vectors are stored in the memory. That is, as shown in FIG. 34, the first three vectors are stored therein. The memory contents in JXi, JYi are held till the processing of one polygon is completed.

Figure 37A:
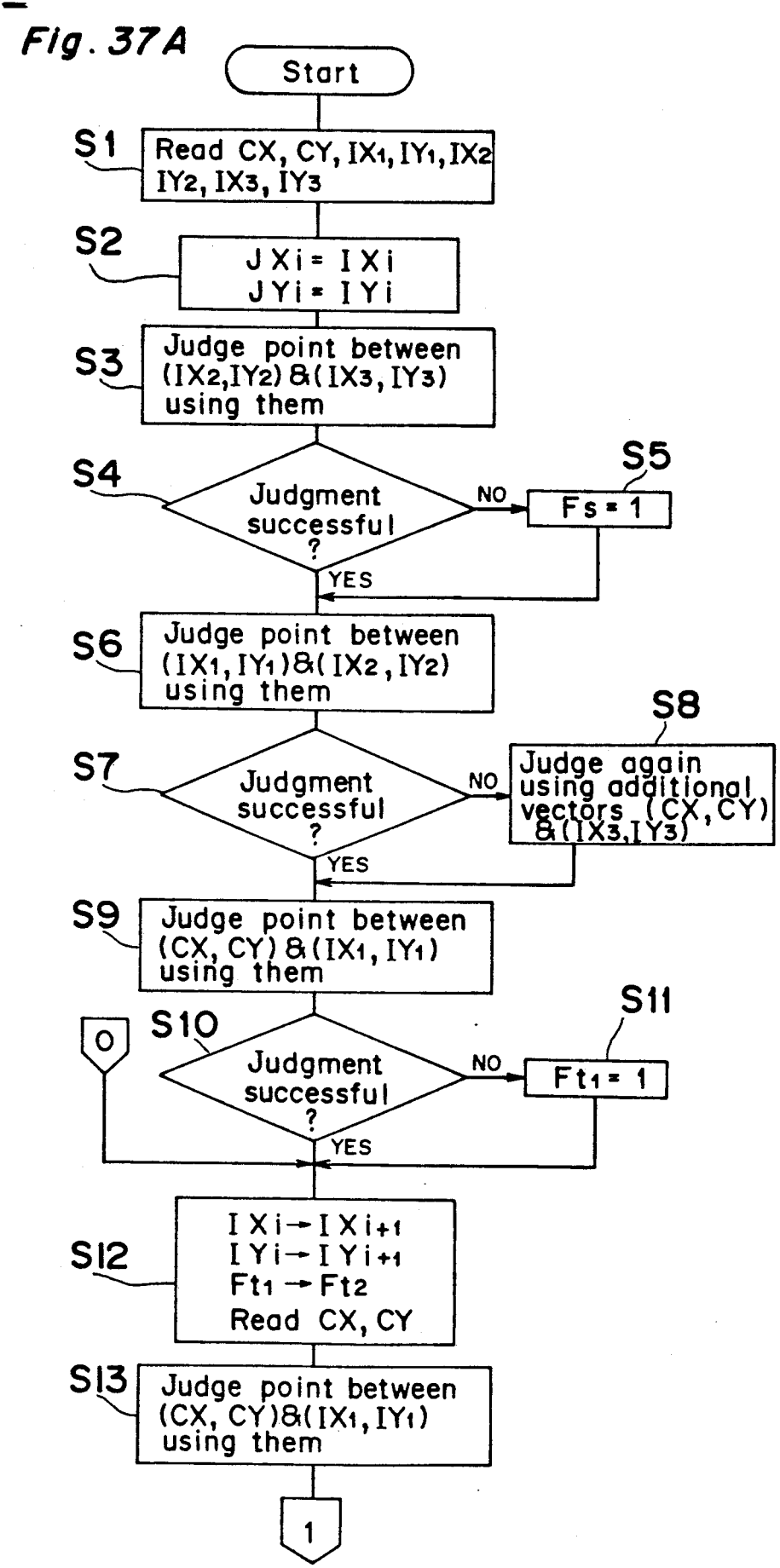
FIGS. 37A and 37B are flow charts showing the processing of a polygon in the fifth embodiment.
Figure 37B:
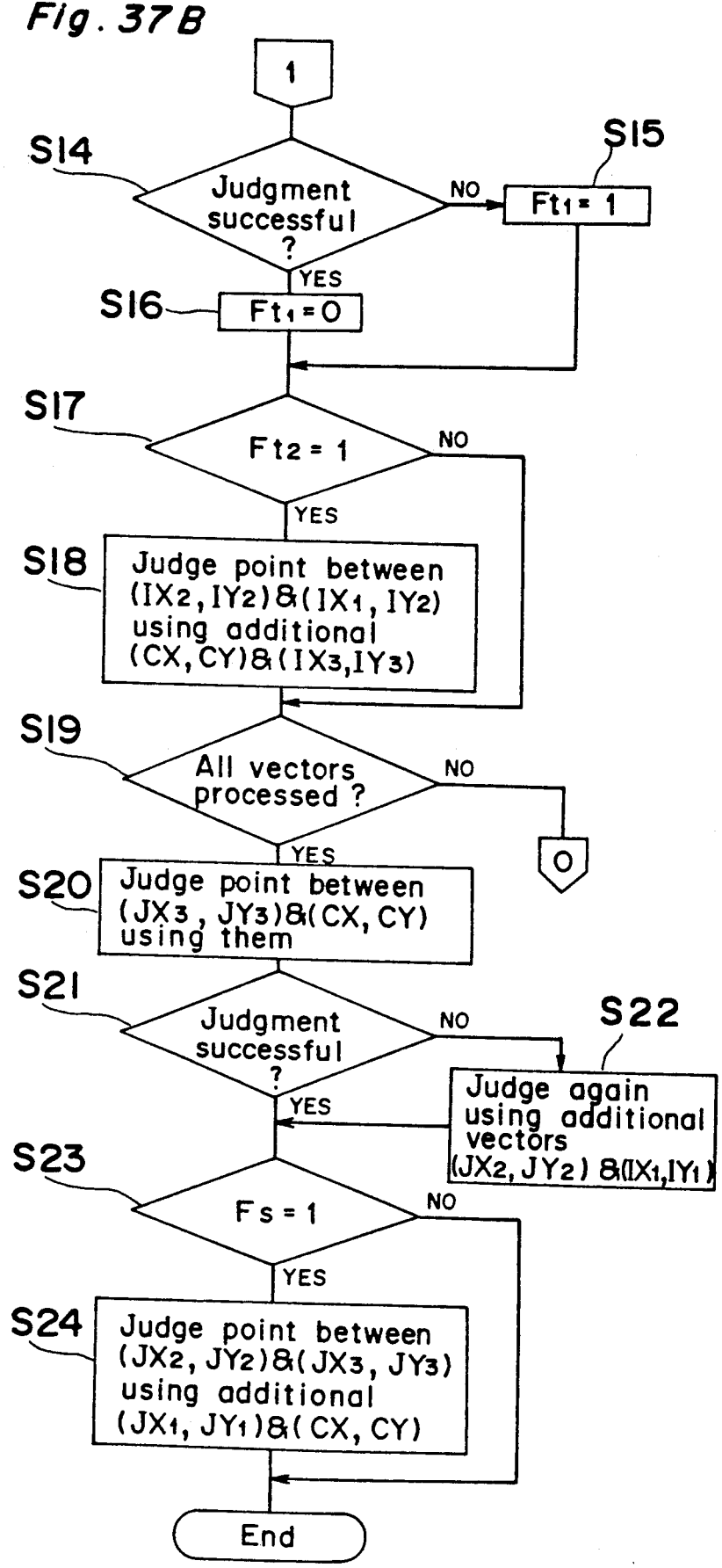

Next, the judgement processing according to the present embodiment will be described with reference to the flow charts in FIGS. 37A and 37B.

First, at step S1, CX,CY, $IX_1,IY_1$, $IX_2,IY_2$, $IX_3,IY_3$ are read in this order beginning with the first vector. At step S2, the first three vectors are stored in $JX_i,JY_i$ (i=1,2,3) by setting $JX_i=IX_i$, $JY_i=IX_i$.

Vectors stored in CX,CY, $IX_i,IY_i$, $JX_i,JY_i$ are called (CX,CY), $(IX_i,IY_i)$, $(JX,JY_i)$ below.

Next, the flow proceeds to step S3, and the transition direction of a point between $(IX_2,IY_2)$ and $(IX_3,IY_3)$, which is the first point, is judged as to the up-and-down and right-and-left by the subtraction between the elements of the two vectors. When the judgement proves impossible, the flow proceeds to step S5, and the flag Fs showing whether the first point could be judged or not (0: judgement possible, 1: judgement impossible) is set at 1 Then, at step S6, the judgement on the second point (point 12 in FIG.33) between $(IX_1,IY_1)$ and $(IX_2,IY_2)$ is effected by these two vectors, and when the judgement proves impossible, the flow proceeds further to step S8, and by using (CX,CY) and $(IX_1,IY_1)$ in addition to the two vectors $(IX_1,IY_1)$ and $(IX_2,IY_2)$, the judgement of the transition direction of the second point is again made in the same manner as described above. When this judgement proves impossible, the flow proceeds to step S11, and the flag $Ft_1$ showing whether it is necessary or not to judge with four vectors (0: unnecessary, 1: necessary) is set to 1.

When the above judgement processing at the initial stage is completed, the flow proceeds to step S12, and the data is shifted like CX,CY $\rightarrow IX_1,IY_1 \rightarrow \ldots \rightarrow (IX_3,IY_3)$, and a new vector is read into CX,CY, and $Ft_1$ is set as $Ft_2$ ($Ft_2=Ft_1$). Thereafter, at step S13, a new point between (CX,CY) and $(IX_1, IY_1)$ is judged using these two vectors. When the judgement results successful, $Ft_1$ is set as zero ($Ft_1=0$) at step S16, and when the judgement results impossible, it is set as 1 ($Ft_1=1$) at step S15. In both cases, the flow proceeds to step S17. Here, when $Ft_2=1$ holds, the flow proceeds from step S17 to step S18, and by adding (CX,CY) and $(IX_3,IY_3)$ to $(IX_1,IY_1)$ and $(IX_2,IY_2)$, the judgement for the point between $(IX_1,IY_1)$ and $(IX_2,IY_2)$ is effected. And when the vector read in at step S12 is not the last vector of the polygon, that is, further vectors of the polygon follow, the flow returns to step S12, and the similar processing will be repeated.

When the processing for all vectors of the polygon is completed, the flow proceeds to step S20, at which by the last vector (CX,CY) and the first vector $(JX_3,JY_3)$, the judgement of the point (point 22 in FIG. 34) therebetween is effected. When said judgement proves impossible, by using the additional vectors $(JX_2,JY_2)$ and $(IX_1,IY_1)$ in addition to the first and last vectors, the judgement is again effected. Next, the flow proceeds to step S23, at which it is judged whether Fs=1 holds or not. When it holds, that is, when the first point (point 21 in FIG. 34) has not been judged at step S4, by adding $(JX_1,JY_1)$ and (CX,CY) to $(JX_2,JY_2)$ and $(JX_3,JY_3)$, the first point is again subjected to the judgement.

According to the present embodiment, as can be understood from the above, judgement is possible on even such points as the point 51 in FIG. 35A or the point 52 in FIG. 35B which would be impossible to be judged as to their location simply by the two vectors starting from and at the same time ending in the respective points.

The above judgement processing includes a processing of referring to a table containing information on judgement criteria against combinations of vectors and then outputting results obtained.

In the above embodiment, the judgement is effected by using the maximum four vectors with i=3. However, such a point as the point 61 in FIG.36 cannot be judged as to whether it is located inside the polygon or not similarly by four vectors directed thereto or departing therefrom. In order to make the judgement possible in such a case, it is required to adopt i=5 with flags being increased accordingly, and to use six vectors at the maximum. Because the number of vectors to be used in the judgement is basically indefinite, i should be properly selected, and when the judgement proves impossible, further judgement may be taken compulsorily.

The present invention thus described, it will be obvious that the same may be varied in many ways. Such modifications are not to be regarded as a departure from the spirit and scope of the present invention, and all such modifications as would be obvious to one skilled in the art are intended to be included within the scope of the following claims.

What is claimed is:

1. An image processing method by which a contour of a figure is represented with a series of clockwise outline vectors, a sense of each vector being set such that the figure be painted out by painting a left side of the vector, and then, an outline is created from the outline vectors, and the figure is painted through a scanning operation in an x-axis direction by starting a painting operation at an odd-numbered intersection of the outline and a horizontal scanning line and suspending the painting operation at an even-numbered intersection of the outline and the horizontal scanning line during the scanning operation, the image processing method comprising the steps of:

(a) calculating plotting points for the outline from the outline vectors through use of Bresenham algorithm;

(b) calculating a positional relation between a current plotting point and a plotting point immediately before the current plotting point and calculating a positional relation between the current plotting point and a point immediately after the current plotting point;

(c) storing in a variation memory unit a positional variation in a y-axis direction between the current plotting point and the plotting point immediately before the current plotting point, which is extracted based on the calculated positional relations, wherein when a position of the current plotting point varied from that of the plotting point immediately before, the variation is stored as a current value, when a position of the plotting point immediately after varies from that of the current plotting point, this variation is stored, and when the position of the current plotting point does not vary relative to both the plotting points immediately before and after the current plotting point, a previous value is maintained;

(d) creating the outline by plotting outline components one after another in accordance with the following rule,
  (i) when the current plotting point and the plotting points immediately before and after have a horizontally reciprocating relation and these three plotting points are aligned in parallel with a x-axis direction, plotting an outline component is done at the current plotting point or a plotting point one dot shifted in the x-axis direction from the current plotting point based on the positional variation stored in the variation memory unit, and
  (ii) when the current plotting point and the plotting points immediately before and after do not have a horizontally reciprocating relation, plotting an outline component is done either at the current plotting point, at a plotting point one dot shifted in the x-axis direction from the current plotting point, at both the current plotting point and a plotting point one dot shifted in the x-axis direction from the current plotting point, or at neither point; and
(e) painting pixels between an odd-numbered intersection of the outline and a horizontal scanning line and an even-numbered intersection of the outline and the horizontal scanning line, inclusive of a pixel at the odd-numbered intersection but exclusive of a pixel at the even-numbered intersection.

2. An image processing apparatus which represents a contour of a figure with a series of outline vectors, setting a sense of each vector such that the figure be painted out by painting a left side of the vector, and then, creates an outline from the outline vectors, and paints out the figure through a scanning operation in an x-axis direction by starting a painting operation at an odd-numbered intersection of the outline and a horizontal scanning line and suspending the painting operation at an even-numbered intersection of the outline and the horizontal scanning line during the scanning operation, the image processing apparatus comprising:
  plotting point calculation means for calculating plotting points for the outline from the outline vectors through use of Bresenham algorithm;
  positional relation calculating means for calculating a positional relation between a current plotting point and a plotting point immediately before the current plotting point and for calculating a positional relation between the current plotting point and a point immediately after the current plotting point;
  variation memorizing means for storing a positional variation in a y-axis direction between the current plotting point and the plotting point immediately before the current plotting point, which is extracted based on the positional relations calculated by said positional relation calculation means, wherein when a position of the current plotting point varies from that of the plotting point immediately before, the variation is stored as a current value, when a position of the plotting point immediately after varies from that of the current plotting point, this variation is stored, and when the position of the current plotting point does not vary relative to both of the plotting points immediately before and after, a previous value is maintained;
  outline creation means for creating the outline by plotting outline components one after another in accordance with the following rule,
    when the current plotting point and the plotting points immediately before and after have a horizontally reciprocating relation and these three plotting points are aligned in parallel with a x-axis direction, plotting an outline component is done at the current plotting point or a plotting point one dot shifted in the x-axis direction from the current plotting point based on the positional variation stored in said variation memorizing means, and
    when the current plotting point and the plotting points immediately before and after do not have a horizontally reciprocating relation, plotting an outline component is done either at the current plotting point, at a plotting point one dot shifted in the x-axis direction from the current plotting point, at both the current plotting point and a plotting point one dot shifted in the x-axis direction from the current plotting point, or at neither point; and
  painting-out means for painting pixels between an odd-numbered intersection of the outline and a horizontal scanning line and an even-numbered intersection of the outline and the horizontal scanning line, inclusive of a pixel at the odd-numbered intersection but inclusive of a pixel at the even-numbered intersection.

3. The apparatus as claimed in claim 2, wherein said outline creation means includes a table indicating the rule.

4. An image processing method by which a contour of a figure is represented with a series of clockwise outline vectors, a sense of each vector being set such that the figure be painted out by painting a left side of the vector, and then, an outline is created from the outline vectors, and the figure is painted through a scanning operation in an x-axis direction by starting a painting operation at an odd-numbered intersection of the outline and a horizontal scanning line and suspending the painting operation at an even-numbered intersection of the outline and the horizontal scanning line during the scanning operation, thereby painting pixels between the odd-numbered intersection and the even-numbered intersection, inclusive of a pixel at the odd-numbered intersection but exclusive of a pixel at the even-numbered intersection, the image processing method comprising the steps of:
  (a) creating the outline successively without plotting a starting pixel of the outline;
  (b) deciding whether to plot the starting pixel or not based on a positional relation between the starting pixel and a next pixel and a positional relation between a last pixel being identical to the starting pixel and a pixel immediately before the last pixel; and
  (c) further deciding whether to plot a pixel one dot shifted in the x-axis direction from the starting pixel or not when the plotting of the starting pixel is decided.

5. An image processing method by which a contour of a figure is represented with a series of clockwise outline vectors, a sense of each vector being set such that the figure be painted out by painting a left side of the vector, and then, an outline is created from the outline vectors, and the figure is painted through a scanning operation in an x-axis direction by starting a painting operation at an odd-numbered intersection of the outline and a horizontal scanning line and suspending the painting operation at an even-numbered intersection of the outline and the horizontal scanning line during the scanning operation, the image processing method comprising the steps of:

(a) calculating prospective pixel points from each outline vector in accordance with Bresenham algorithm;

(b) determining whether every prospective pixel on each outline vector is to be plotted or not based on the following rule, (i) when the outline vector is a vector increasing or decreasing both in the x-axis direction and in the y-axis direction, and when a currently obtained prospective pixel point varies in y-ordinate relative to a prospective pixel point immediately before the currently obtained prospective pixel point, the prospective point immediately before is plotted, on the other hand, when the current obtained prospective pixel point does not vary in y-ordinate relative to the prospective pixel point immediately before, the prospective pixel point immediately before is not plotted, (ii) when the outline vector is a vector increasing in the x-axis direction and decreasing in the y-axis direction or a vector decreasing in the x-axis direction and increasing in the y-axis direction and with an absolute value of a variation amount in the x-axis direction being larger than that in the y-axis direction, and when a currently obtained prospective pixel point varies in y-ordinate relative to a prospective pixel point immediately before the currently obtained prospective pixel point, the currently obtained prospective pixel point is plotted, on the other hand, when the currently obtained prospective pixel point does not vary in y-ordinate relative to the prospective pixel point immediately before, the currently obtained prospective pixel point is not plotted, and (iii) when the outline vector is a vector in which an absolute value of a variation amount in the x-axis direction is not larger than an absolute value of a variation amount in the y-axis direction, all prospective pixel points are plotted; and (c) creating the outline from the plotted prospective pixel points.

6. An image processing method by which a contour of a figure is represented with a series of outline vectors, a sense of each vector being set such that the figure be painted out by painting a left side of the vector, and then, an outline is created from the outline vectors, through when contracting the figure, new outline vectors are created by contracting the outline vectors, comprising the steps of:

(a) determining whether a variation amount in a y-axis direction of each outline vector is negative, zero, or positive;

(b) plotting an outline in accordance with Bresenham algorithm when the variation amount is negative;

(c) plotting no outline when the variation amount is zero;

(d) plotting the outline at a position one dot shifted in an x-axis direction from a position determined according to the Bresenham algorithm when the variation amount is positive;

(e) painting the figure through a scanning operation in the x-axis direction by starting a painting operation at an odd-numbered intersection of the outline and a horizontal scanning line and by suspending the painting operation at an even-numbered intersection of the outline and the horizontal scanning line during the scanning operation, thereby painting pixels between the odd-numbered intersection and the even-numbered intersection, inclusive of a pixel at the odd-numbered intersection but exclusive of a pixel at the even-numbered intersection; and (f) painting pixels on a segment connecting a starting point and an end point of the new outline vector obtained by the contraction when contracting the figure.

7. A method for judging a transition direction of integer vectors, which have their respective dimensional elements composed of $+1$, $-1$ or $0$ and constitute a polygon when connected to each other, wherein the integer vectors are successively received one after another, and a transition direction is judged with respect to an end point of each integer vector on the polygon, the method comprising the steps of:

(a) storing a predetermined number of first received integer vectors out of all received integer vectors;

(b) temporarily storing a newly received integer vector and the same number of previously received integer vectors as the first received integer vectors;

(c) judging the transition direction of the end point of the integer vector based on the stored integer vectors; and (d) when the judgement of the transition direction of the end point executed in said step (c) proves impossible further judging the transition direction based on a new text integer vector received and integer vectors stored when this new next integer vector is received.

* * * * *